March 14, 1967 J. J. THAYER 3,309,001
MACHINES AND METHODS FOR FORMING DECORATIVE ARTICLES
Filed March 18, 1963 10 Sheets-Sheet 2

INVENTOR.
JOSEPHUS J. THAYER
BY Pendleton, Neuman
Seibold & Williams Attys

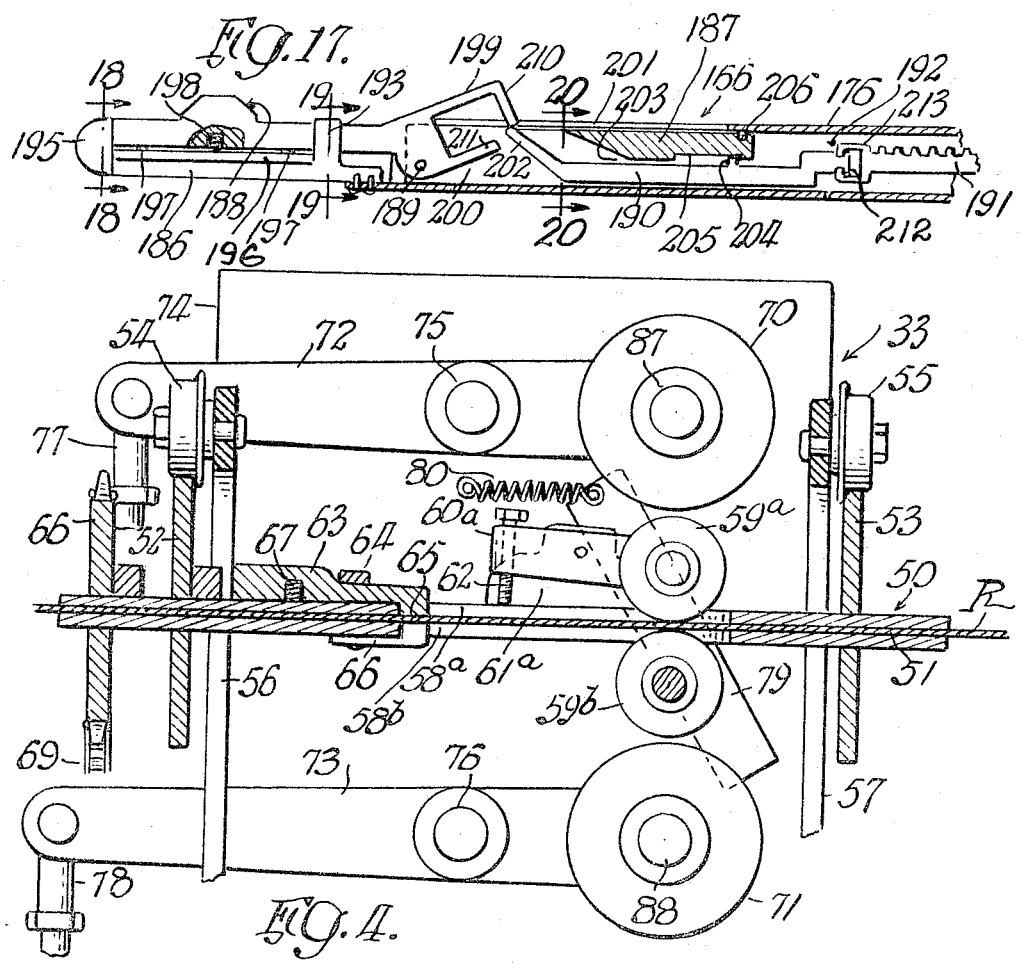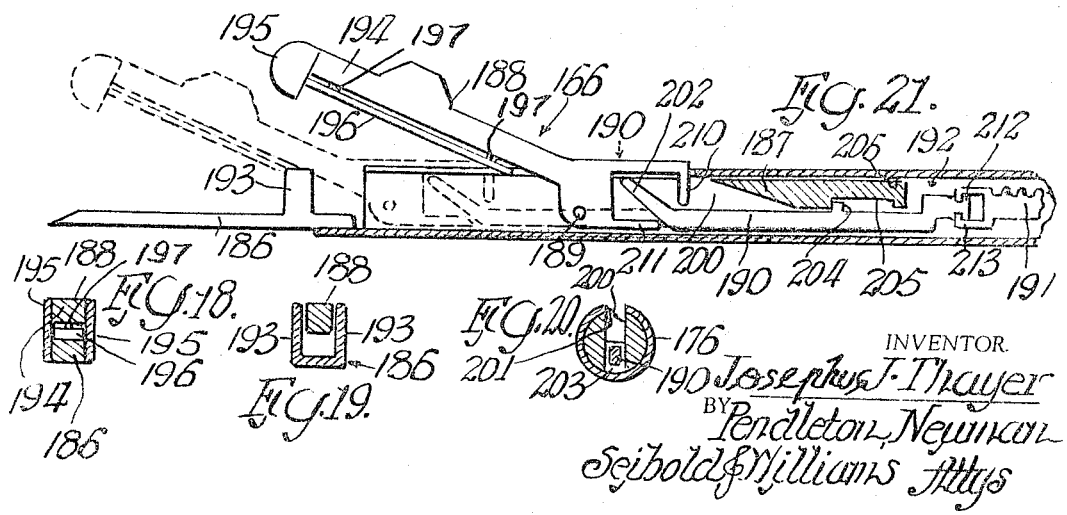

March 14, 1967     J. J. THAYER     3,309,001
MACHINES AND METHODS FOR FORMING DECORATIVE ARTICLES
Filed March 18, 1963     10 Sheets-Sheet 4
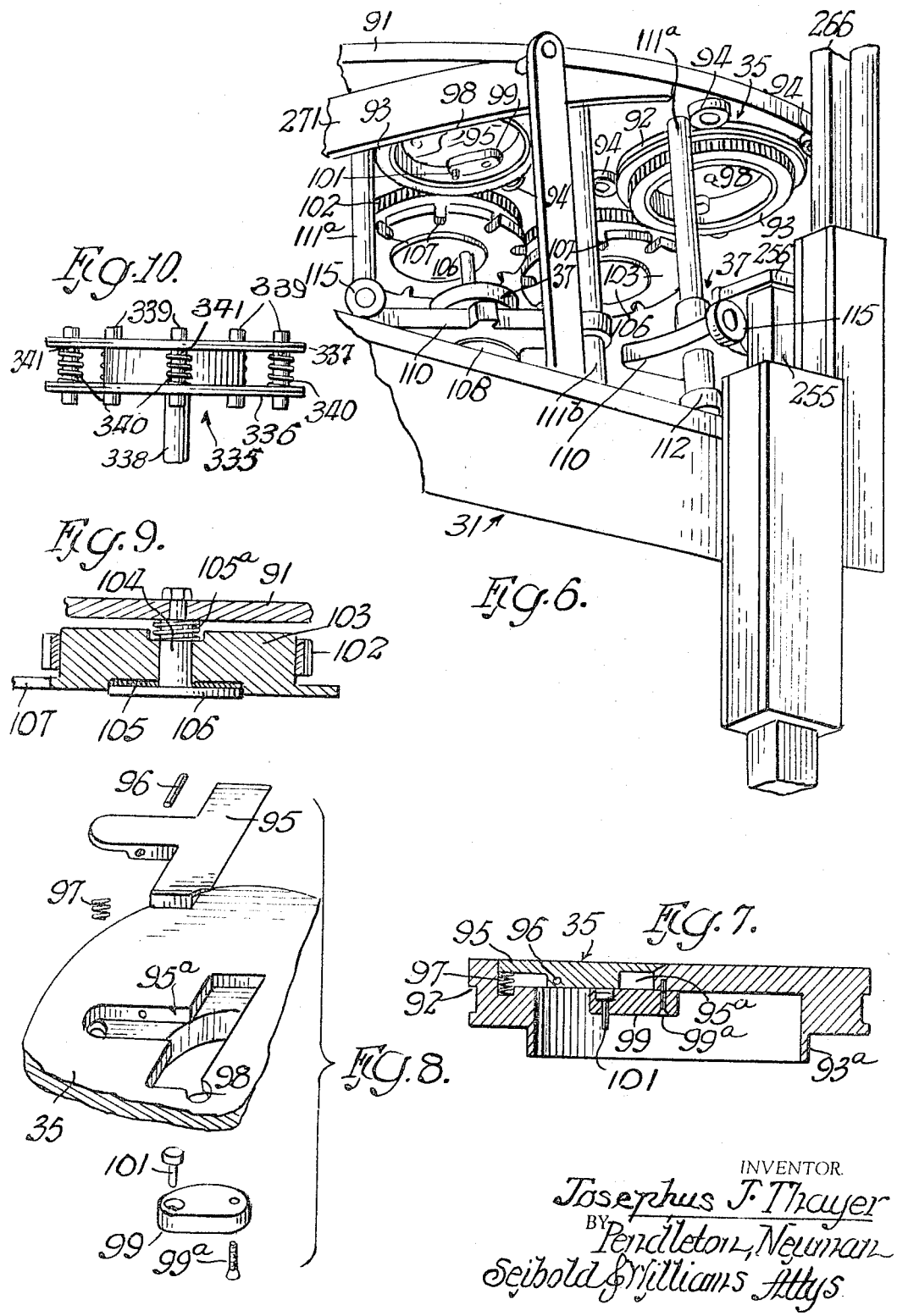
INVENTOR.
Josephus J. Thayer
BY Pendleton, Neuman
Seibold & Williams Attys March 14, 1967  J. J. THAYER  3,309,001
MACHINES AND METHODS FOR FORMING DECORATIVE ARTICLES
Filed March 18, 1963  10 Sheets-Sheet 5
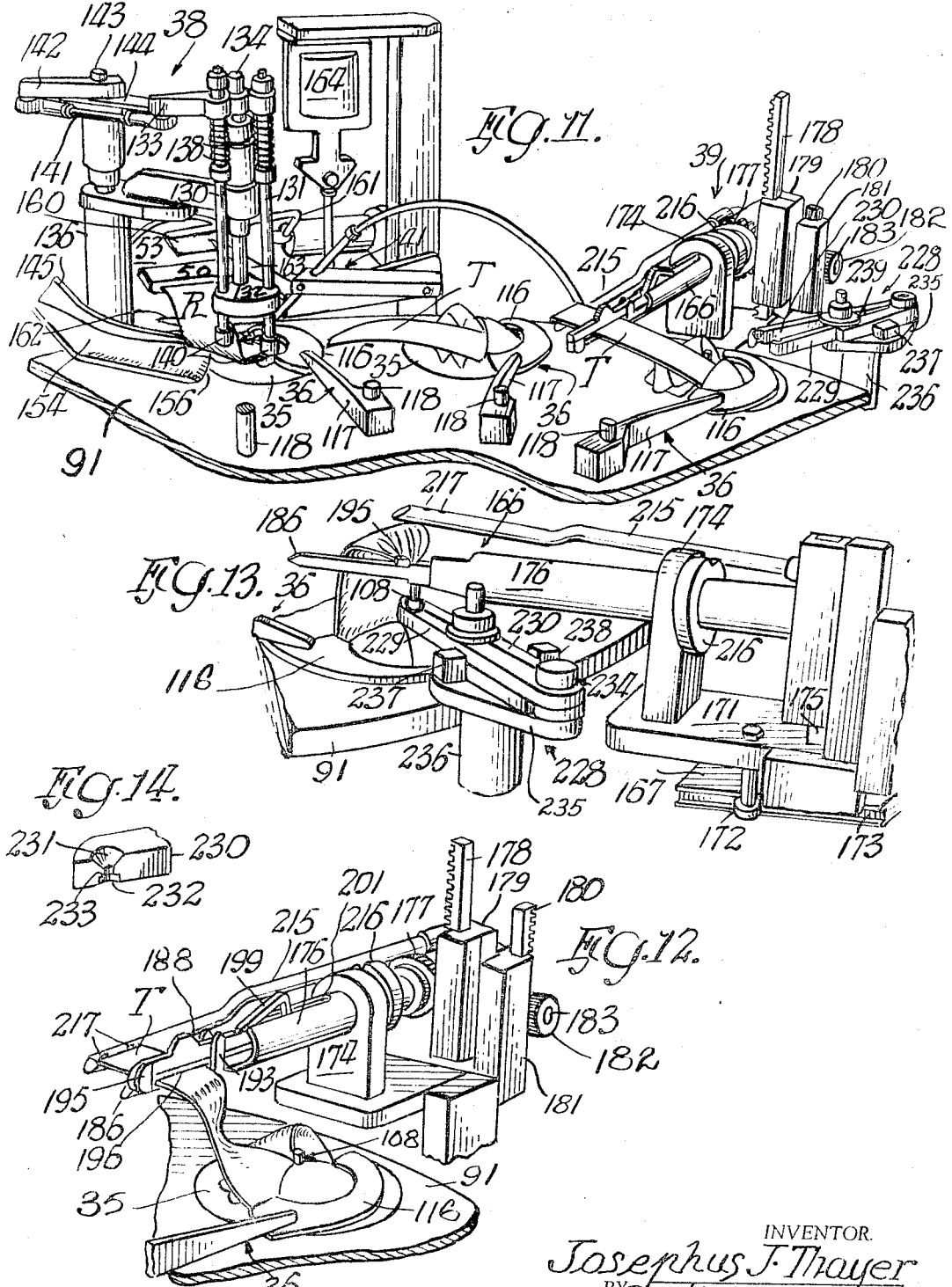
INVENTOR.
Josephus J. Thayer
BY Pendleton, Neuman,
Seibold & Williams Attys

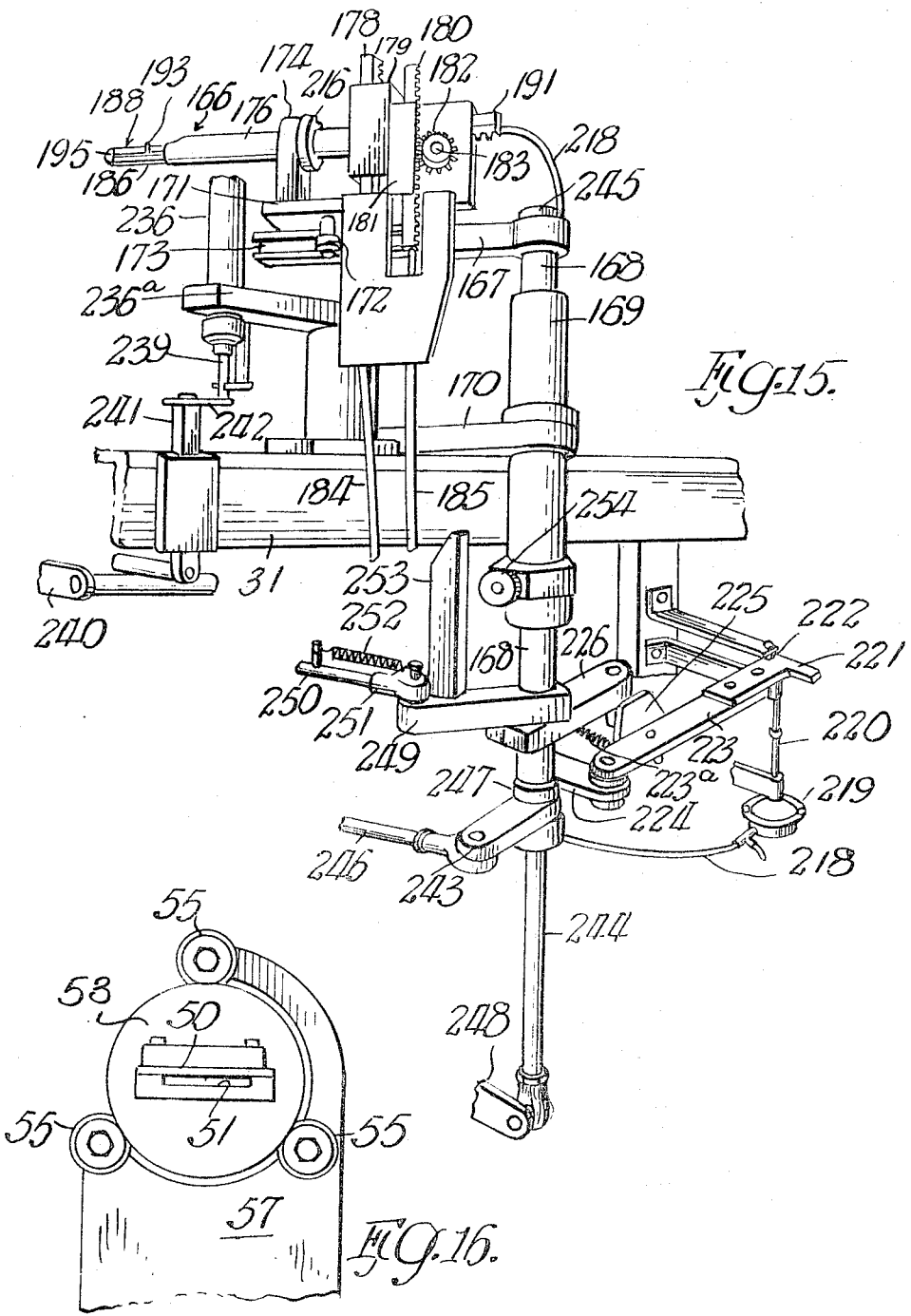

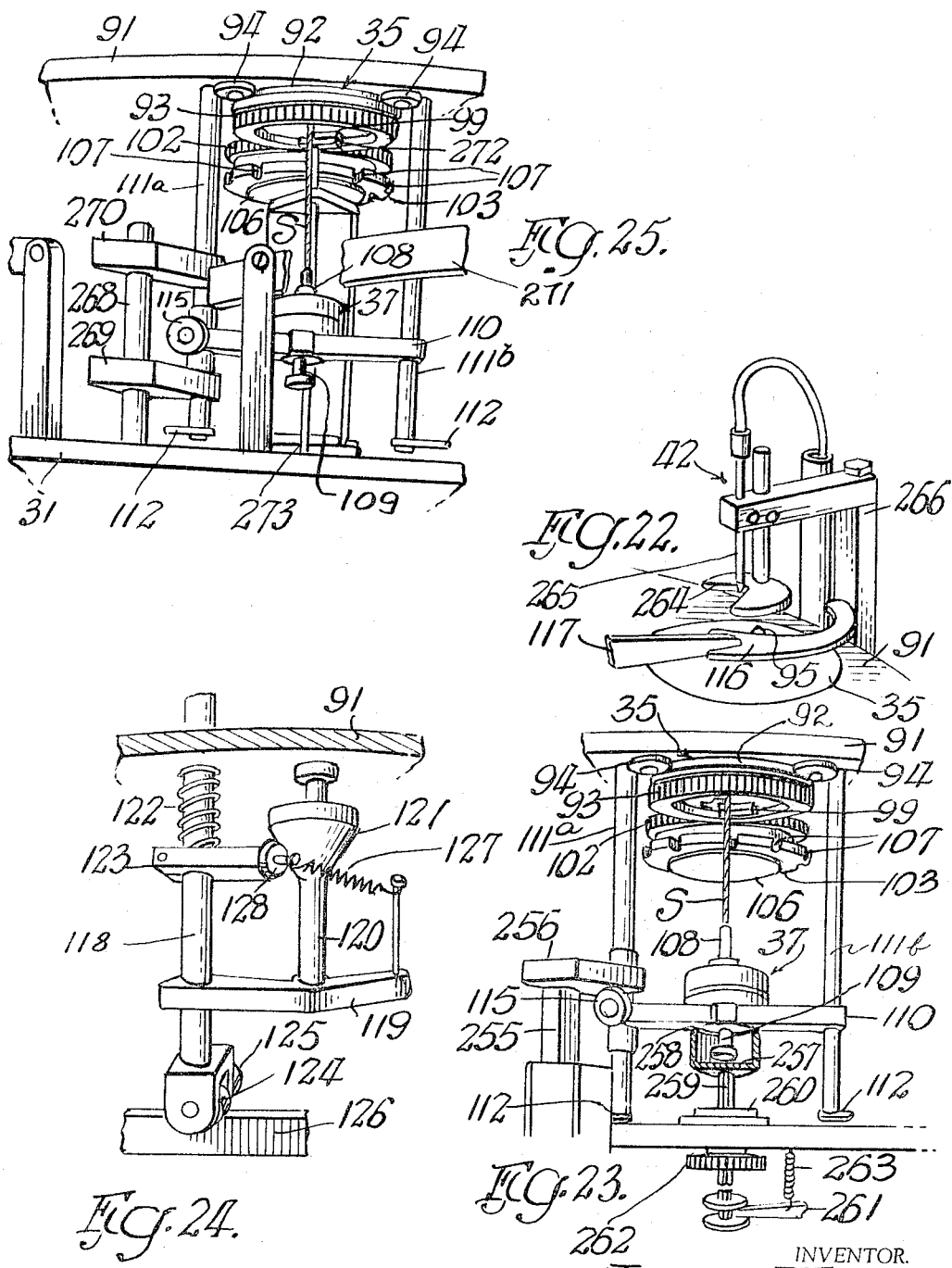

March 14, 1967  J. J. THAYER  3,309,001
MACHINES AND METHODS FOR FORMING DECORATIVE ARTICLES
Filed March 18, 1963  10 Sheets-Sheet 8
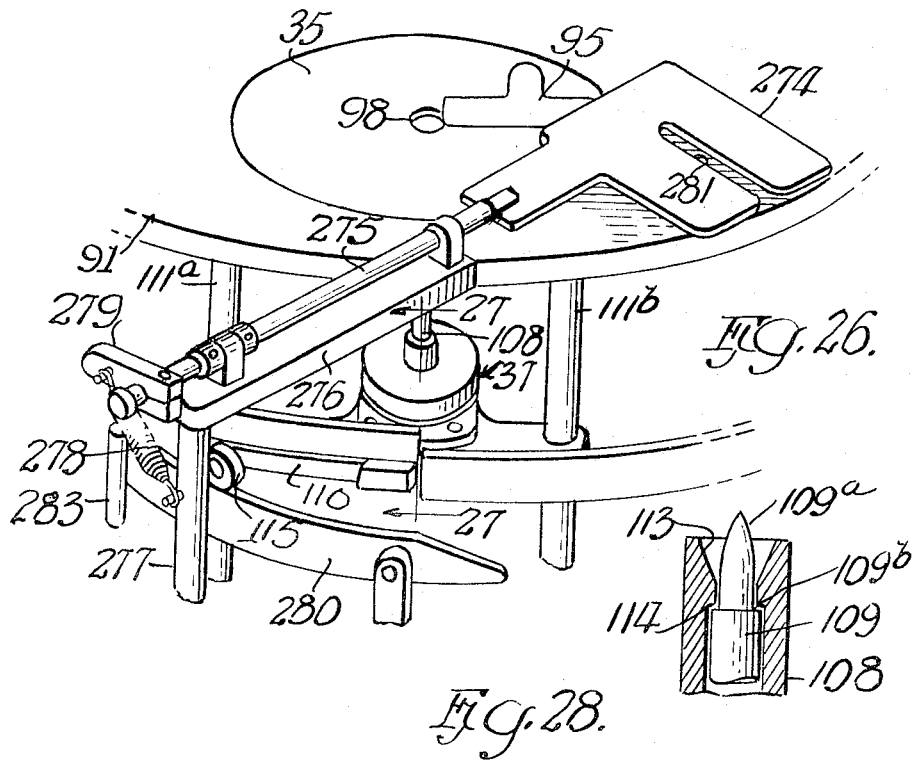
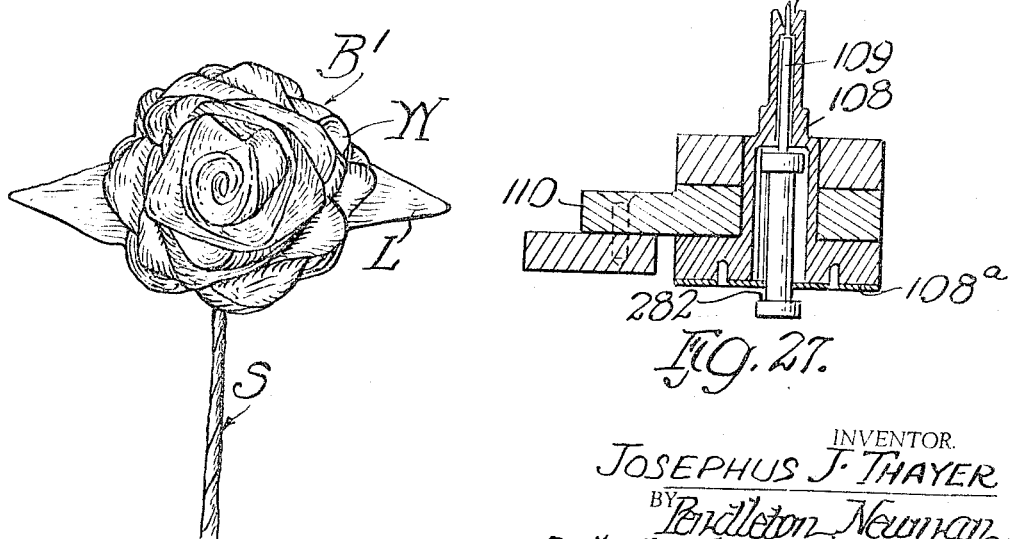
INVENTOR.
JOSEPHUS J. THAYER
BY Pendleton, Neuman,
Seibold & Williams Attys

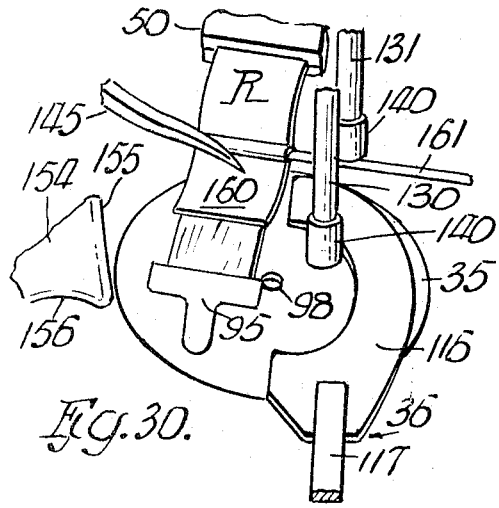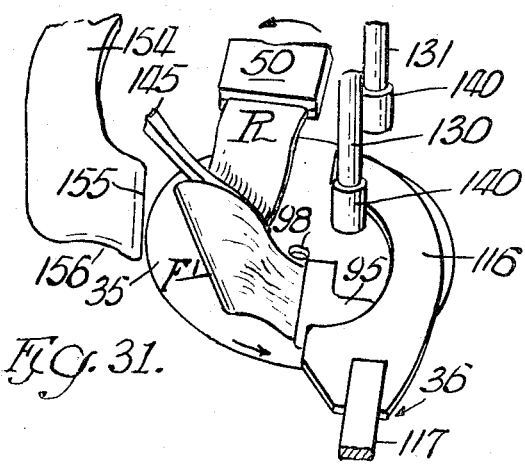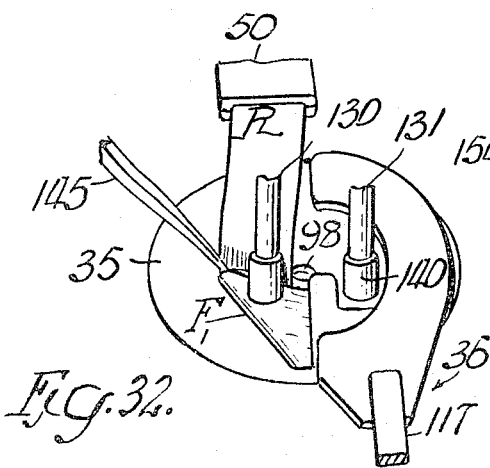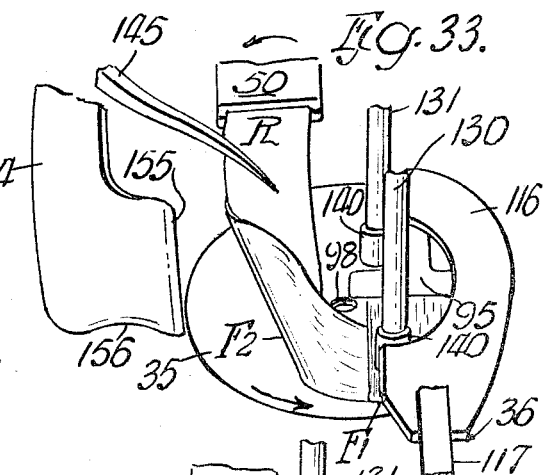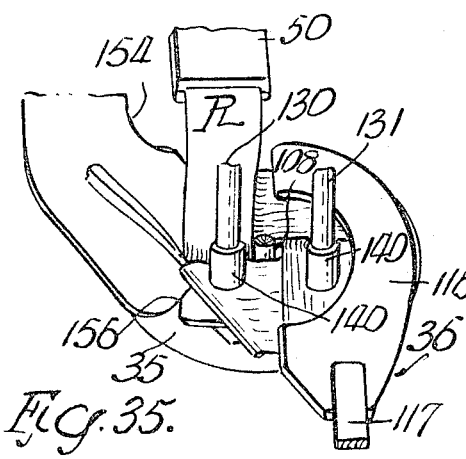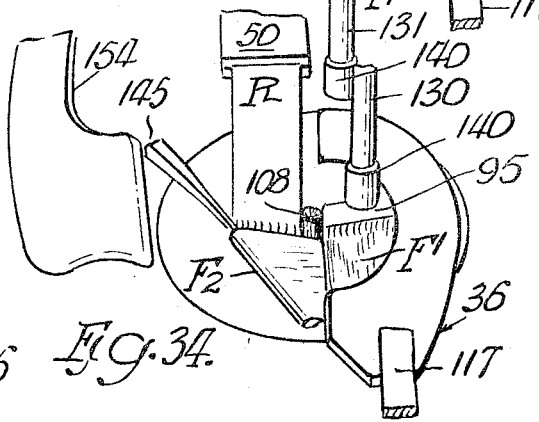

March 14, 1967  J. J. THAYER  3,309,001
MACHINES AND METHODS FOR FORMING DECORATIVE ARTICLES
Filed March 18, 1963  10 Sheets-Sheet 10
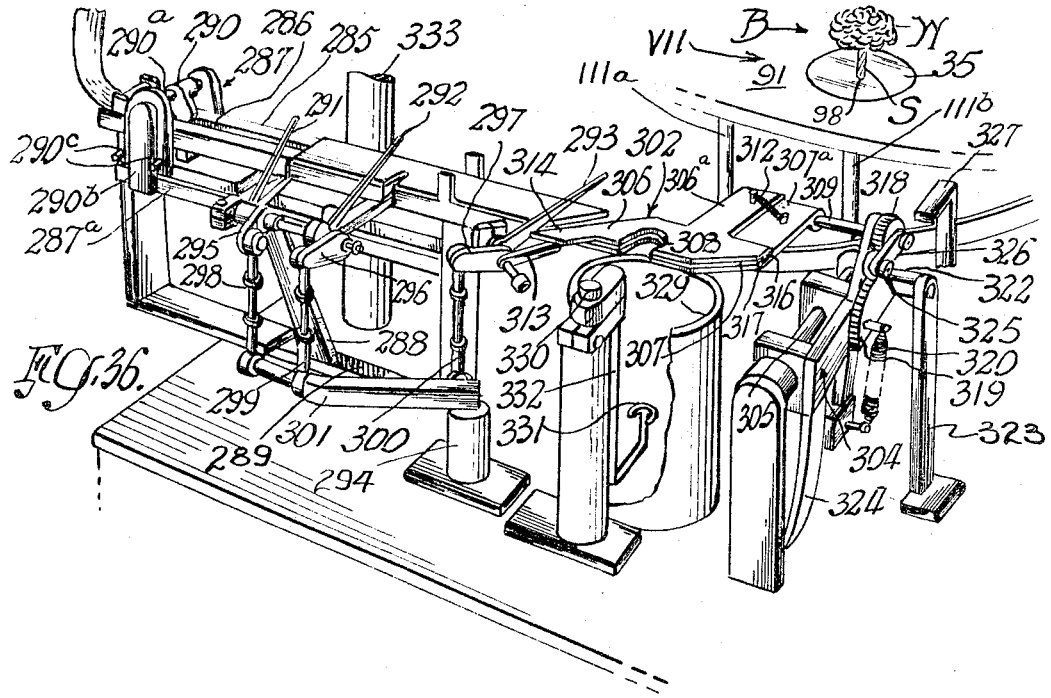
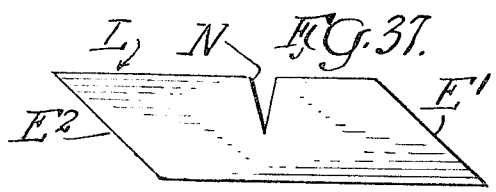
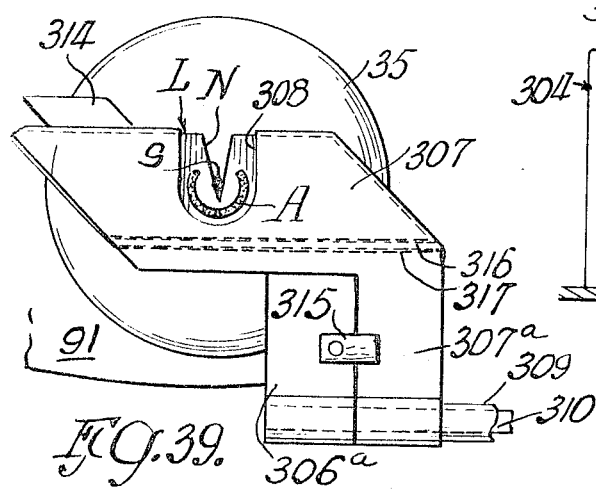
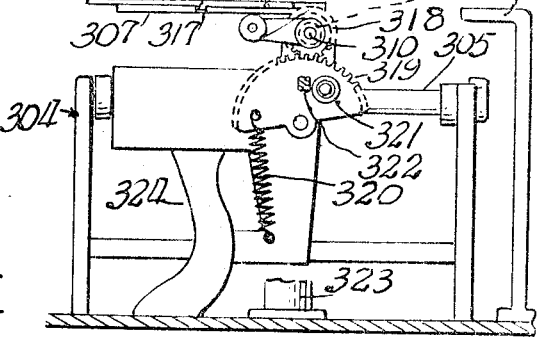
INVENTOR.
JOSEPHUS J. THAYER
BY Pendleton, Neuman,
Seibold & Williams Attys United States Patent Office 3,309,001
Patented Mar. 14, 1967

3,309,001
MACHINES AND METHODS FOR FORMING DECORATIVE ARTICLES
Josephus J. Thayer, West Lafayette, Ind., assignor to Thayer, Inc., Wolcott, Ind., a corporation of Indiana
Filed Mar. 18, 1963, Ser. No. 265,732
49 Claims. (Cl. 223—46)

This invention relates to machines for forming decorative articles and more particularly to machines adapted for forming lengths of ribbon into distinctive decorative articles, for instance of a form resembling a flower such as the rose.

A wide variety of decorative bows and other novel decorative articles fabricated of strip materials such as ribbon have been proposed and/or introduced into the market, particularly in recent years. Some of these decorative articles are of a form which can be partially or wholly fabricated by a machine, or at least with the aid of mechanical devices, and various machines have been developed to accomplish these ends. These developments have been the result of, or perhaps the cause of a large and apparently increasing demand for inexpensive yet distinctive novel decorative articles suitable for use as decorations, for instance in wrapping gifts and in packaging various products for retail sale, notably near the time of festive holidays.

One widely accepted and distinctive form of decorative article is that of a flower, and particularly a rose. Efforts have previously been made to take advantage of the general acceptance of these decorative forms by producing decorative articles which imitate flowers, and various modes and methods of forming such articles from ribbon have been proposed. However, most such efforts have been notable for their requirement of skillful, tedious hand labor, and consequently for the relatively high cost of the finished product.

It is the primary object of this invention to provide an apparatus capable of rapidly producing distinctive decorative articles from ribbon, particularly articles resembling a natural rose.

It is a further object of this invention to provide an apparatus capable of economically producing distinctive decorative articles from ribbon.

It is a further object of this invention to provide improved machine components and subassemblies adapted for use in forming distinctive decorative articles from ribbon.

In carrying out this invention in one form, a machine is provided comprising a rotatable ribbon support and a feed means adapted to feed successive portions of a length of ribbon to said support and to rotate the ribbon about its feed axis as it is fed thereto to accumulate a generally helically arranged succession of folds of ribbon on the support. Threading apparatus is provided to thread one end of the length of ribbon through the center of the accumulated folds, and twisting means is arranged to twist such end portion relative to the accumulated folds to form a decorative article.

For a more complete understanding of this invention, reference should be had to the machine illustrated in the drawings wherein:

FIG. 4 (Sheet 6) is an enlarged elevation view, partially in section, of the feed mechanism illustrated in FIG. 3;

FIG. 5 (Sheet 1) is an enlarged elevation view of a part of the drive arrangement for the feed mechanism of FIG. 3;

FIG. 6 is a perspective view of a portion of the underside of the turret of the machine in FIG. 1, illustrating the mechanism at two work stations and a part of the spinner drive;

FIG. 7 is an enlarged cross-sectional view of a rotatable ribbon support disk taken along line 7—7 of FIG. 2 and looking in the direction of the arrows;

FIG. 8 is an enlarged exploded view of the clip and component parts therefor which are disposed on the ribbon support disk of FIG. 7;

FIG. 9 is an enlarged cross-sectional view of a drive member for driving the ribbon support disk;

FIG. 10 is an enlarged side elevation view of a clutch for engaging the drive member of FIG. 9;

FIG. 11 is an enlarged perspective view of the ribbon folding, gathering and tucking mechanism of the machine in FIG. 1 in operation;

FIG. 12 is an enlarged perspective view illustrating the ribbon gathering and tucking mechanism just prior to gathering of the ribbon end;

FIG. 13 is an enlarged perspective view of the gathering and tucking mechanism, including the guide mechanism as the gathered ribbon end is inserted into the spinner;

FIG. 14 is an enlarged view of a portion of the guide mechanism of the gathering and tucking apparatus;

FIG. 15 is an enlarged perspective view of the support and drive arrangement for the gathering and tucking apparatus;

FIG. 16 is an enlarged end elevation view of a portion of a ribbon feed guide support;

FIG. 17 is an enlarged cross-sectional view of the ribbon gatherer;

Figure 1:
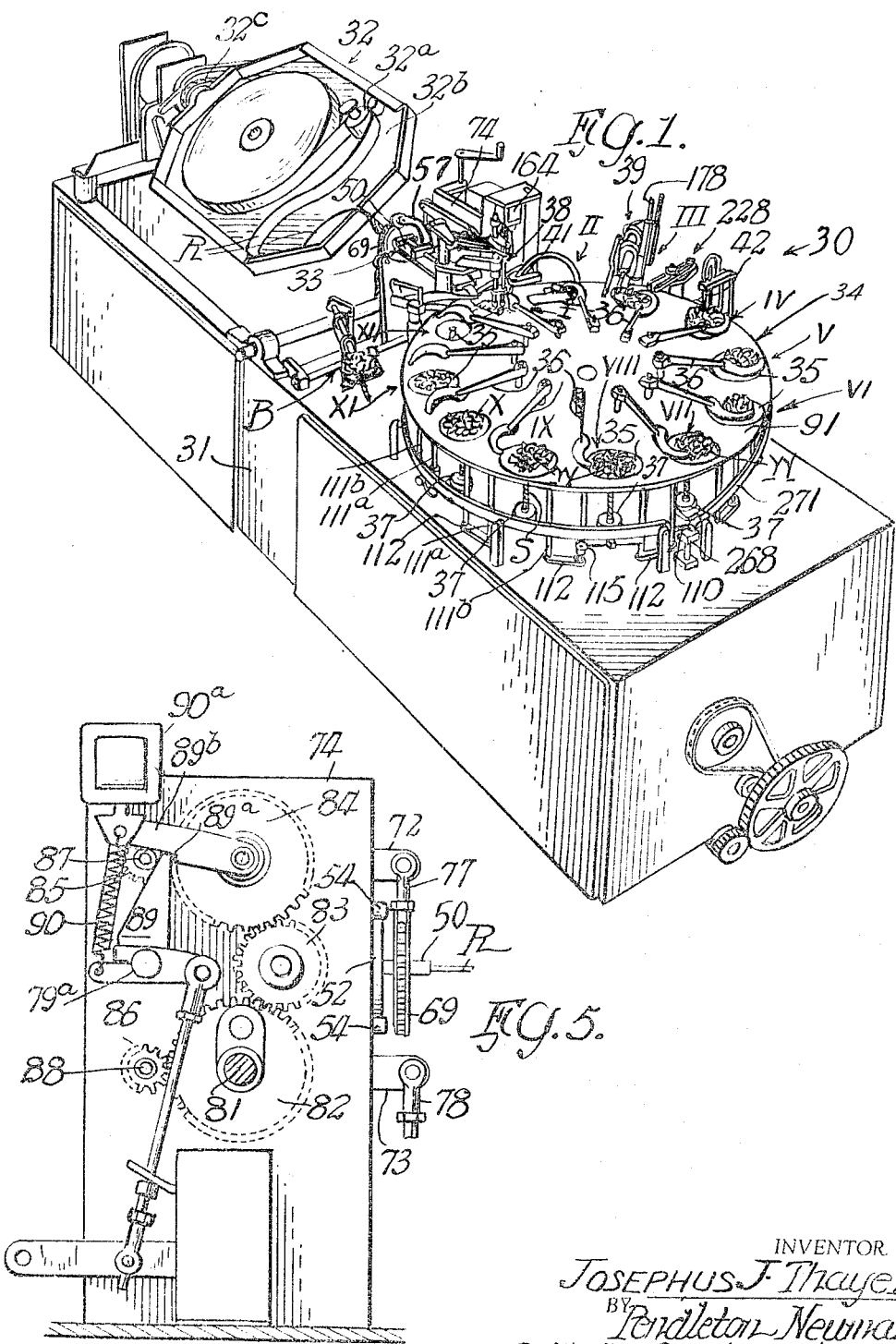
FIG. 1 is a perspective view of a machine employing the teachings of this invention and illustrating decorative articles in the various stages of fabrication.

FIGS. 18, 19 and 20 are cross-sectional views on lines 18—18, 19—19 and 20—20, respectively, of FIG. 17 and looking in the direction of the arrows;

FIG. 21 is a cross-sectional view of the apparatus of FIG. 17 in changed positions;

FIG. 22 is an enlarged perspective view of the fold compacting and spray apparatus of the machine in FIG. 1;

FIG. 23 is an enlarged perspective view of the spinner drive arrangement of the machine in FIG 1;

FIG. 24 is an enlarged perspective view of a support and drive mechanism for the hold down hands on the turret of the machine in FIG. 1;

FIG. 25 is an enlarged perspective view of the release and indexing mechanism of the machine in FIG. 1;

FIG. 26 is an enlarged perspective view of the discharge apparatus of the machine in FIG. 1;

FIG. 27 is an enlarged vertical cross-sectional view of a spinner assembly taken along line 27—27 of FIG. 26 and looking in the direction of the arrows;

FIG. 28 is an enlarged cross-sectional view of a portion of the spinner of FIG. 27;

FIG. 29 is a perspective view of one type of decorative article which may be produced with the machine of FIG. 1;

FIGS. 30 through 35 illustrate various steps in the ribbon folding operation carried out by the machine of FIG. 1;

FIG. 36 is a perspective view of an accesssory forming and positioning apparatus which may be incorporated in the machine of FIG. 1;

FIG. 37 is a top plan view of a leaf simulating strip formed and applied by the mechanism of FIG. 36;

FIG. 38 is an end elevation view of a part of the mechanism of FIG 36, and

FIG. 39 is an enlarged top plan view of the applicator hand of the mechanism in FIG. 36 positioning a leaf strip at the indexing position of the machine in FIG. 1.

The machine 30 illustrated in the drawings is adapted to form ribbon R into a decorative article B and/or B' having the general appearance of a natural rose, see FIGS. 1 and 29.

Referring first to FIG. 1, the machine 30 comprises, generally, a framework and housing 31, a rotatable ribbon spool support 32, a rotatable and reversible ribbon feed mechanism 33, a rotatable turret 34 including a plurality of symmetrically arranged work stations, twelve in the illustrated embodiment, which are for supporting and moving the ribbon during fabrication of the articles, and cooperative mechanism at each of several positions around the turret for performing various operations on the ribbon and/or formed articles. The apparatus at each work station of turret includes a rotatable support disk 35, a hold down hand 36 and a reciprocable and rotatable spinner 37. These work stations are moved successively to twelve positions by suitable intermittent rotary movement of the turret 34. For reference purposes these positions will be designated hereinafter as positions I through XII, corresponding to the positions of the stations as illustrated in FIG. 1, beginning at the station opposite the feed means 33 and progressing clockwise as indicated. Since the apparatus at each work station on the turret duplicates the apparatus at each other station, common reference numerals will be utilized for all stations and the parts will often be referred to in the singular. However, it is to be understood that the following descriptions pertinent to a work station in various circumstances of operation are equally applicable to the mechanism of each station in the same circumstances.

In addition to the ribbon feed arrangement at position I the illustrated mechanism for cooperataive action with the work station apparatus to form decorative articles includes ribbon folding apparatus 38 at position I, ribbon end gathering and tucking mechanism 39 adjacent position III, a spinner drive arrangement 40 at position IV (see FIG. 23), and spray apparatus 41 and 42 at positions I and IV respectively. Auxiliary cooperative mechanism includes release and indexing apparatus at position VII (see FIG. 25), accessory applying apparatus 43 adapted to be disposed adjacent position VII (see FIG. 36), and discharge apparatus 44 at position XII.

The overall operation of the illustrated machine is briefly as follows: Feed mechanism 33 intermittently extends and unidirectionally rotates successive portions of a length of ribbon R and, in cooperation with the folding apparatus 38, forms a length of the ribbon into a series of folds disposed in several helically arranged convolutions on a disk 35 in position I, note FIGS. 30–35. Spray apparatus 41 may be utilized to apply activating or adhesive material to the initial folds to secure these initial or base folds of the article together. The respective hand 36 holds the accumulated folds in place as the turret is cycled to move the folded ribbon to successive positions. Gatherer-tucker mechanism 39 at poistion III then grasps and laterally collapses the distal end portion of the tail or free end T of the folded length of ribbon and inserts this end into the respective spinner 37 as illustrated in FIGS. 11–13. In position IV the spinner is moved downward to pull the end T down through the center of the accumulated folds and is simultaneously rotated in a direction corresponding to the turns of the helix of ribbon folds (see FIG. 23) to tighten and rearrange the upper folds into their final decorative form and to twist the end T into a stem S. Spray apparatus 42 may be utilized to apply an adhesive or setting material to set the twisted folds and stem in their final form. Subsequent to adequate drying, for instance during passage through succeeding positions, the basic decorative article B is completed.

An added feature of the illustrated invention is the provision of the accessory applying apparatus 43 which is adapted to form a leaf-like accessory strip L (FIG. 37) and to cooperate with the apparatus at position VII to apply the strip to an article B. Apparatus 43 forms each strip L with a V-notch N, then daubs it with adhesive adjacent the notch, see FIG. 39. Meanwhile the article B is raised at position VII to admit the strip L between the body W of the article and the subjacent disk 35 (see FIG. 36). The mechanism 43 then positions the strip astraddle the stem S of the article, and the article is pulled downward to seat the body W on the adhesive on strip L. Drying of the adhesive occurs at subsequent positions, and the completed article B' (FIG. 29) is removed by the discharge apparatus 44 at position XII.

The various specific illustrated components and their operation are described in greater detail below.

Ribbon feed apparatus

The ribbon feed apparatus comprises the spool support 32 which is rotatable about the axis of ribbon feed, and the ribbon feed mechanism 33.

Figure 2:
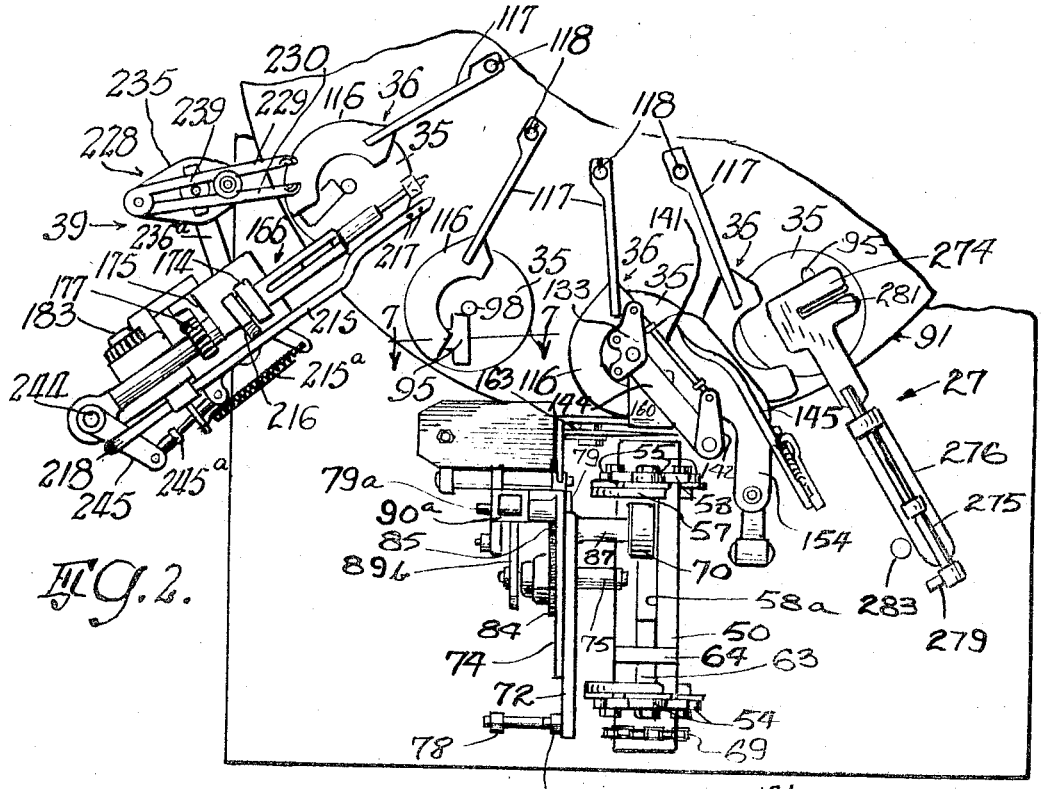
FIG. 2 is an enlarged top plan view of a portion of the machine in FIG. 1.
Figure 3:
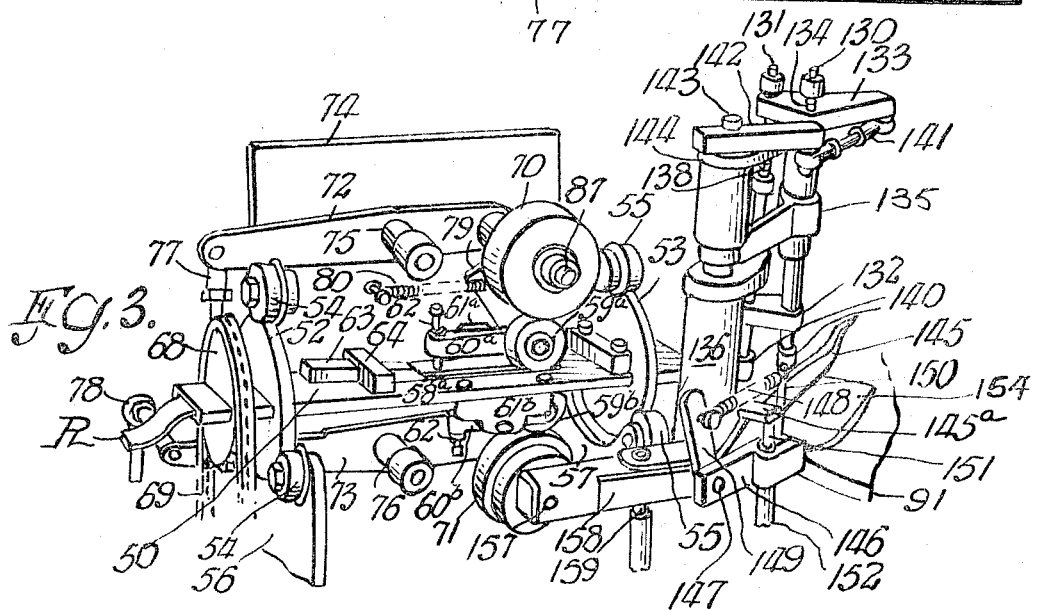
FIG. 3 is an enlarged perspective view of the ribbon feed and folding mechanism of the machine in FIG. 1.

Referring particularly to FIGS. 2, 3 and 4, the illustrated ribbon feed mechanism 33 includes an elongated feed guide member 50 mounted for rotation about its longitudinal axis and formed with a ribbon passage aperture 51 extending axially therethrough. A pair of circular plates 52 and 53 encompass the guide 50 near its opposite ends and are in turn supported by three rollers 54 and three rollers 55 supported on members 56 and 57, respectively, note FIG. 16. The upper ends of the members 56 and 57 are each formed with a suitable opening whereby the guide 50 may be rotated about its longitudinal or ribbon feed axis.

The guide member 50 is formed with a pair of opposed slots 58a and 58b communicating with the longitudinal aperture 51 intermediate its length. A pair of opposed feed rollers 59a and 59b extend through slots 58 into the aperture 51 and engage the ribbon therebetween as best seen in FIG. 4. The feed rollers are mounted on arms 60a and 60b which are in turn pivotally mounted on blocks 61a and 61b secured to opposite sides of the guide member 50 as illustrated. Adjustment screws 62 are provided to adjust the positions of the rollers 59a and 59b.

A drag brake member 63 is pivotally retained on one side of guide 50 by a block 64 and includes a brake extension 65 extending into slot 58a and engaging the ribbon R against an opposing member 66 under the influence of a compression spring 67.

The guide member 50 and apparatus supported thereon is intermittently unidirectionally rotated through arcs of 180° by a drive arrangement including a sprocket wheel 68 encompassing and secured to one end of the guide 50. A roller chain 69 drives sprocket 68 and is driven from a suitably timed intermittent motion drive mechanism, such as a Geneva wheel drive (not shown).

It will be appreciated that each successive rotation of guide member 50 through an arc of 180° will result in reversal of the positions of the guide 50 and feed rollers 59a and 59b. Rollers 59a and 59b are driven in their two feed positions by a pair of drive rollers 70 and 71 secured on drive shafts mounted in the respective ends of rocker arms 72 and 73. Arms 72 and 73 are pivotally mounted on shafts 75 and 76 extending from support plate 74. Connecting rods 77 and 78 are connected to the ends of rocker arms 72 and 73 opposite the drive rollers 70 and 71 for selectively positioning the drive rollers in their engaged and disengaged positions with respect to the adjacent feed rollers 59a and 59b. A bar 79 is pivotally supported on support plate 74 and positionable between the roller supporting ends of rocker arms 72 and 73 to lock rollers 70 and 71 in their disengaged or non-driving positions, but is biased to its inoperative position as by a tension spring 80.

Referring now more specifically to FIG. 5, a suitable mechanism for providing the rotational drive for the two drive rollers 70 and 71 takes its impetus from a drive shaft 81 which is drive connected to a train of gears 82, 83 and 84 as illustrated. Gears 82 and 84 are coaxial with the mounting shafts 75 and 76 of the rocker arms 72 and 73, and these gears are in driving relation with a pair of spur gears 85 and 86 which are secured on the opposite ends of the drive shafts 87 and 88 mounting the drive rollers 70 and 71, respectively. Suitable slots (not shown) are provided in plate 74 for the movement of these drive shafts as the rocker arms 72 and 73 are positioned by reciprocable movement of the connecting rods 77 and 78. Since the feed rollers and spur gears 85 and 86 are mounted on the rocker arms for pivotal movement about the axis of gears 82 and 84, the rollers may be positioned by movement of the rocker arms without altering the drive engagement of the respective spur gears 85 and 86 with the drive gears 82 and 84.

A linkage to selectively position bar 79 between arms 72 and 73 includes a latch arm 89 secured to the shaft 79a which also supports the bar 79. Latch arm 89 is adapted to engage a shoulder 89a on lever 89b when shaft 79a is rotated to the position illustrated in FIG. 5 to place bar 79 in lock-out engagement with the rocker arms. A tension spring 90 biases shaft 79a and arm 89 to the released position of bar 79, and biases arm 89b downward. A solenoid 90a is connected to arm 89b for raising it to release the latch arm 89. A suitable linkage is provided, such as that illustrated, to permit the machine operator to conveniently swing shaft 79a to the latched position and thereby to halt the ribbon feed.

The ribbon spool support 32 comprises a housing which is rotated continuously in timed relation with the intermittent unidirectional rotation of ribbon guide 50, through a suitable correlated drive mechanism (not shown), to avoid twisting of the ribbon. A driven roller 32a operates against an idler roller to unwind ribbon from the storage spool and maintain a loose supply in compartment 32b. The drive for roller 32a is derived from a sprocket 32c rotatably mounted on the housing support shaft and suitably driven at a rotational velocity which is variable independently of the speed of rotation of support 32, whereby the rate of feed of ribbon from the supply spool into compartment 32b may be varied.

*Turret construction*

The rotatable turret 34 includes a table 91 supporting and carrying the work station mechanism including the support disk members 35, the hands 36, spinners 37 and part of the attendant drive apparatus.

Referring now particularly to FIGS. 6, 7 and 8 each rotatable disk 35 is formed with a peripheral groove 92 adjacent the underside of the table 91 and an annular shoulder 93a therebelow adapted to receive a gear 93. Four rollers 94 mounted on the underside of table 91 around the periphery of each member 35 engage in groove 92 to rotatably support the respective disk. A gripper clip 95 is set into each disk 35 in a top recess 95a so that its upper surface is coplanar with the top surface of the disk when the clip is closed as in FIG. 7. The clip 95 is pivotally supported on a pin 96 and is spring biased to a closed or gripping position by a compression spring 97. One edge of the clip 95 conforms to a central aperture 98 in disk 35 adapted to receive the upper end of a spinner 37. A block 99 disposed in a coaxial recess 100 and secured to the underside of each disk 35, as by a screw 99a, reciprocably supports an operating pin 101 extending therethrough for forcing the clip 95 open against the force of spring 97.

A drive gear 102 meshes with each gear 93 and is mounted on a hub 103 rotatably supported beneath the table 91 on a shaft 104 positioned radially inward of each member 35 as illustrated in FIG. 6. A bearing washer 105 may be interposed between hub 103 and the head 106 of shaft 104, and a compression spring 105a is confined between table 91 and hub 103. The hub 103 is formed with suitable clutch means, such as slots 107 and a lower planar friction surface, to be engaged by cooperating clutch members of a drive train at the appropriate work stations as will be later described.

Referring now to FIGS. 23 and 26–28, the spinner 37 at each work station comprises a shell 108 and a captive reciprocable pin 109 confined by plate 108a. The shell 108 is rotatably mounted on a support 110 which in turn is frictionally slidably mounted on a pair of vertical posts 111a and 111b depending from table 91 and each joined to an adjacent post at another work station by a bar 112. Pins 109 include a pointed upper end 109a (FIG. 28) extending upwardly from an annular shoulder 109b. Each shell 108 is formed with an outwarly flaring funnel-shaped upper opening 113 with a central aperture to receive end 109a of the pin, and includes an internal shoulder 114 adapted to abut shoulder 109b for ribbon gripping purposes. A roller 115 is mounted on and extends from each support 110 for engagement with drive apparatus to effect vertical sliding movement of the support 110, and spinner assembly 37, on posts 111a and 111b as will be later described.

Each hold down hand 36 is formed with an arcuate portion 116 adapted to extend generally around one side of the central opening 98 in disk 35, see FIG. 2. Portion 116 is mounted on an arm 117 secured to a shaft 118 which is mounted for rotary oscillation and vertical reciprocation to manipulate the hand. Referring to FIG. 24, the shaft 118 extends through table 91 and through a bracket 119 suspended beneath the table on a stud 120 which is provided with a conical cam surface 121. A compression spring 122, confined between the underside of table 91 and an operating arm 123 on shaft 118, biases the hand 36 downward against the upper surface of the respective disk 35. Rollers 124 and 125 are mounted on the lower end portion of shaft 118 to be engaged by suitable drive means, such as the cam rail 126 or a reciprocating drive element, to selectively raise hand 36 above the disk 35. Tension spring 127 is attached to arm 123 and support 119 to maintain follower roller 128 in contact with stud 120. Reciprocation of shaft 118 with roller 128 positioned against the lower cylindrical portion of stud 120 raises and lowers the hand and maintains the arcuate portion 116 disposed over the respective member 35 as in FIG. 2. However, when shaft 118 is raised a sufficient distance to engage roller 128 against conical surface 121, the hand 36 is rotated to a raised retracted position as at positions IV through XI in FIG. 1.

*Ribbon folding mechanism*

The mechanism at position I which cooperates with the feeding and turret mechanism to accomplish the folding operation will be described with particular reference to FIGS. 2, 3 and 11.

A pair of reciprocable presser members 130 and 131 extend through a guide block 132 and through a drive block 133. Both of these blocks are secured on shaft 134 which is reciprocably and rotatably journalled in a sleeve 135 mounted on a fixed hollow standard 136. The presser members are biased downward by compression springs 137 and 138 confined between drive block 133 and collars 139 secured to the presser members as illustrated to effect yieldable clamping engagement with a subjacent disk 35 in position I. Gripping elements such as rubber tips 140 may be provided at the lower end of each presser member.

A connecting rod 141 connects the drive block 133 to a drive arm 142 which is in turn secured on a shaft 143 extending upward through a cylindrical standard 136 and supported therein for timed rotary oscillation and vertical reciprocation by suitable drive means. Bar 144 is supported on shaft 143 and engages shaft 134 between drive block 133 and a subjacent collar. As shaft 143 is reciprocated vertically, it carries the drive arm 142, connecting rod 141, bar 144, drive block 133, shaft 134, block 132 and the presser feet 130 and 131. Rotary oscillation of shaft 143 operates the linkage 142, 141, 133 and thereby causes oscillation of the presser feet between the positions of FIGS. 32 and 33 along an arc centered on the axis of shaft 134. Thus rotation and reciprocation of shaft 143 provides rotary and reciprocal drive of the presser feet.

Referring particularly to FIG. 3, a folding finger 145 is mounted on arm 146 for vertical pivotal movement about its mounting pin at 147 and is spring-biased to a lower position by a tension spring 148 connected to an extension 149 of finger 145 and to a pin 150 mounted in arm 146. A reciprocably mounted rod 151 extends through the hollow shaft 152 on which arm 146 is mounted and engages a lip member 145a extending from the finger 145 whereby reciprocation of rod 151 lifts finger 145. Rotary oscillation of the shaft 152 oscillates finger 145 sidewise, i.e., about the axis of shaft 152. As will be observed in FIG. 2 the finger 145 extends from a position to one side of the egress end of guide 50 outwardly at an angle of about 45° to the axis of the guide 50 and over the adjacent edge of a disk 35 in position I, to overlie the adjacent edge of ribbon projected forwardly from guide 50.

Guard plate 154 extends generally parallel to and beneath finger 145 to overlie the adjacent edge of a disk 35 in position I, forwardly of guide 50. The outer or forward end of this plate, overlying the disk 35, is generally flat but includes an upturned edge 155 (FIG. 33) disposed generally toward the center of disk 35, i.e., counterclockwise of disk, and a tapered distal edge 156. The plate 154 is designed to overlie and rest on successive layers of folded ribbon as they are accumulated on the disk 35 in position I and to move laterally to clear disk 35 for admitting ribbon to the clip 95 (see FIG. 30). For these purposes the plate 154 is loosely pivotally mounted at 157 on a support 158 (FIG. 3) which is in turn supported on a shaft 159 for rotary oscillation in a horizontal plane.

*Operation at position I*

The operation of the aforedescribed mechanism at position I will now be described. It is assumed that drive roller 70 rotates clockwise (FIG. 3) to advance ribbon through guide 50, and that drive roller 71 is driven in the opposite direction.

A disk 35 is positioned at position I with the respective clip 95 aligned with and facing toward the guide 50. The clip is opened by a suitably timed reciprocating drive which moves member 101 upward. A guide 160 mounted on arm 161 (FIGS. 2, 11 and 30) is positioned in front of guide 50 to direct the leading end of the ribbon R beneath the open clip 95. The ribbon feed cycle is then started whereby the adjacent feed roller 59 is engaged by drive roller 70 to extend the leading end of the ribbon against guide 160 and beneath the open clip 95, as illustrated in FIG. 30, and to place a slack length of ribbon over the disk. The clip is then closed and the disk 35 turns approximately ¼ turn or slightly more (100°) counterclockwise (as viewed from above) while the feed guide 50 is rotated 180° counterclockwise (as viewed from the front). The outer edge of the ribbon is thus turned under the ribbon to form a loose fold $F_1$ as seen in FIG. 31. Finger 145 descends into the fold $F_1$ as illustrated in FIGS. 31 and 32, and the opposite feed roller 59 is engaged by its drive roller 71 to retract the ribbon and draw the fold snugly around the finger 145 as seen in FIG. 32. Slippage of the feed roller on the ribbon and/or slippage of a suitable safety clutch in the feed roller drive provides tension control during this fold-tightening step. The presser feet are then moved clockwise to their engagement position and descend to engage the fold as seen in FIG. 32. Ribbon for the next fold is then advanced by engagement of the drive roller 70 with the adjacent feed roller, and hand 36 is raised by a suitably timed reciprocating driver which engages roller 125 (FIG. 24). The disk 35 and the engaged presser feet 130–131 then simultaneously rotate approximately 100° counterclockwise to the position illustrated in FIG. 33, thereby pulling fold $F_1$ off of finger 145, while the feed guide 50 is again rotated 180° counterclockwise to begin the next fold $F_2$. Hand 36 then descends to engage the first fold $F_1$, the presser feet 130–131 are raised, finger 145 descends into fold $F_2$ and the ribbon is retracted to tighten fold $F_2$ as seen in FIG. 34 while the feet oscillate back to their engagement position. During the formation of the second fold $F_2$, the spinner 37 is moved upwardly by a suitably timed reciprocating driver to extend the upper end of shell 108 upward through the center opening in the disk 35 as shown in FIGS. 34 and 35. The presser feet then descend to clamp the second fold, ribbon feed begins for the third fold, guide 50 rotates another 180° counterclockwise, the hold down hand 36 is raised, rotation of the disk and presser feet begins, and finger 145 retracts as the aforedescribed steps for forming fold $F_2$ are repeated to form the third fold. The fold guard plate 154 moves from the retracted position of FIG. 34 to the functional position over disk 35 as in FIG. 35 during the formation of the third fold. As new folds are formed and the disk 35 continues to rotate, the previously formed folds pass beneath the plate 154. The plate 154 thus serves as a forming platform or guard to prevent the ribbon from catching on preceding folds as each subsequent new fold is formed. The folding cycle steps aforedescribed for forming the second and third folds are repeated (lesser lengths of ribbon being required for these folds than for the engagement of the leading end in the clip and forming of the first fold), with the presser feet holding the folds during rotation of the disk 35 and the hold down hand 36 holding the folds during the return cycle of the presser feet, until a suitable number of folds are accumulated in a generally helical pattern on the disk 35.

After an appropriate number of folds for an article blank are formed, e.g. twenty-six in the case of one simulated rose bloom, the hand 36 remains down in clamping position, being held by spring 122, the presser feet are raised, finger 145 and guard plate 154 are retracted, and a cutter mechanism, such as a pair of scissor blades 162 and 163 (FIG. 11), one of which is driven by a solenoid 164, cuts the ribbon adjacent the adjacent end of feed guide 50. The last-formed "fold" is thus released. The turret is then cycled to carry the folded blank to position II and then to position III in the form seen in FIGS. 1 and 11, i.e., the leading end clamped beneath clip 95, the accumulated folds held by the hand 36, and a free tail T extending counterclockwise and generally parallel to the adjacent edge of the turret 34 from the last, topmost fold beneath hand 36.

*Gathering and tucking mechanism*

Referring now to FIGS. 2, and 11–15, the gathering and tucking mechanism 39 includes a gatherer 166 for grasping the tail end of ribbon extending from the folds accumulated by the operations at position I and inserting this tail in the spinner 37, a gauging apparatus to regulate the length of tail extending from the gatherer 166, and a guide device 228. The gatherer 166 is supported on an arm 167 which is in turn mounted on a hollow shaft 168 rotatably and reciprocably supported in a sleeve 169 fixed on the machine frame by a bracket 170 as illustrated in FIG. 15. A sliding support block 171 is mounted for relative movement longitudinally along arm 167 on a set of rollers 172 engaging opposed grooves in arm 167 as at 173. A pair of bearing blocks 174 and 175 are mounted on slide block 171 and rotatably receive the cylindrical housing 176 of the ribbon gathering mechanism 166. A pinion 177 is secured on housing 176 and is engaged by a rack 178 reciprocably supported in a block 179 mounted on bearing block 175 for rotating the gatherer 166 as hereinafter described. A second rack 180 is vertically reciprocably supported in a block 181 also mounted on support block 175 and engages pinion 182 on shaft 183 to reciprocate the gatherer 166 as also hereinafter described. The two racks 178 and 180 are reciprocated in appropriate timed sequence with the operation of the cooperative mechanism through appropriate drives such as flexible control cables 184 and 185.

Referring now more particularly to FIGS. 17 and 18–21, the gatherer 166 includes a hollow tubular housing 176, a finger 186 fixed to the distal end of the housing 176 and a relatively movable slide mechanism comprising a cylindrical slide block 187 slidably disposed within the housing 176, a movable gripper finger 188 pivotally secured to the slide block at 189, a cam link 190 in lost motion engagement with the slide block 187 and a rack 191 which engages the link at 192. The fixed finger 186 is a narrow elongated member disposed generally parallel to the axis of the housing 176 and includes a pair of spaced upstanding ears 193, adapted to straddle finger 188, see FIG. 19. The movable finger 188 includes an elongate body portion 194 disposed generally parallel to finger 186 when in a closed position as in FIG. 17, a pair of ears 195 adapted to extend astraddle finger 186, a gripping shoe 196 retained on a pair of guide studs 197 and resiliently biased away from the body portion 194, towards finger 186, by a compression spring 198, and an actuator portion 199. The portion 199 extends within a diametral slot 200 formed in the slide block 187 and an aligned slot 201 in housing 176. Link 190 extends generally parallel to the axis of the tube 176, through a longitudinal slot 203 communicating with slot 200 in the slide block 187, and includes a cam extension 202 for engagement with the actuator portion 199 in slot 200. A pin 204 extends from link 190 into a groove 205 in the slide block to form the lost motion connection therebetween. A brake member 206 is supported in the slide block 187 and frictionally engages the interior wall of the housing 176 to restrict the movement of the slide block and insure lost motion operation between the link 190 and block 187 as will be later described.

Movement of link 190 to the right from the position illustrated in FIG. 17 will carry the slide block 187 and hence the movable finger 188 to the right due to the engagement of pin 204 with the right end of groove 205. During this movement the uppermost end of cam extension 202 is engaged under the lower end of the depending leg 210 of actuator portion 199 thereby locking the movable finger 188 down and hence maintaining the clamping bar 196 in engagement with the fixed finger 186 as the ears 195 are moved to a position adjacent ears 193 to laterally collapse or gather ribbon gripped between fingers 186 and 188. When link 190 is next moved to the left, the first result is that link 190 moves to the left relative to slide block 187 and hence relative to movable finger 188, this relative motion being aided by the frictional engagement of the brake member 206 with housing 176. During this movement, the cam extension 202 moves into the internal opening of the actuator portion 199, unlocking the movable finger 188 from its closed position, and the lower inclined cam surface of extension 202 engages the leg 211 to swing the movable finger 188 to an open position as illustrated in FIG. 21. Pin 204 then engages the left-hand end of groove 205 and further movement of the link 190 to the left will thereby carry the slide block 187 and the movable finger 188 to their extended position but with the finger 188 opened as illustrated in dashed lines in FIG 21. Thereafter, movement of the link 190 to the right will again result in relative movement between the link and the slide block 187, within the limits of movement of pin 204 in groove 205, whereby the upper inclined surface of cam extension 202 will engage leg 210 and thereby swing finger 188 to the closed and locked position illustrated in FIG 17.

The connecting arrangement at 192 includes an annular shoulder 212 formed on the end of link 190 and a C-shaped connector 213 on rack 191 for engaging the shoulder 212 whereby the gatherer mechanism may be rotated relative to the rack 191 while maintaining the connection between the rack 191 and the link 190. A pinion (not shown) mounted on shaft 183 (FIG. 15) engages rack 191 to reciprocate link 190 and thereby operate the gathering mechanism as just described.

Gauging apparatus 214 comprises a pneumatic (vacuum operated) control system including a sensing tube 215 pivotally mounted on support 175 for horizontal swinging movement and spring biased against a cam stop 216 on housing 176 by a spring 215a (FIG. 2). The tube 215 is formed with a pair of air-bleed holes 217 in its upper side, adjacent finger 186 and beneath the position normally assumed by the free end of a ribbon tail T gripped by gatherer 166, note FIGS. 11 and 12. A flexible air conduit 218, shown in part in FIGS. 2 and 15, connects tube 215 to the vacuum-line connection of a vacuum operated diaphragm unit 219 (FIG. 15). The diaphragm in unit 219 is connected to a plunger 220 and is spring biased to an upper position wherein the plunger forces brake plate 221 against a friction brake element 222 fixed to the machine frame. Plate 221 is secured on an arm 223 pivotally mounted on a bracket 224 extending from the machine frame and is spring biased in a counterclockwise direction by a tension spring 223a. Arm 223 includes an abutment plate 225 opposite an abutment member on an arm 226 which is secured to shaft 168.

Guide device 228, best illustrated in FIGS. 2, 11, 13 and 14, is designed to engage the upper ends of spinner shells 108 and facilitate insertion of the tail T of the ribbon into the opening 113 in the spinner 37. The guide 228 comprises a pair of opposed clamp arms 229 and 230 formed with complementary guide recesses in their distal ends. Referring particularly to FIG. 14, these recesses include an upper conical or funnel-shaped portion 231 terminating in a lower end of a lesser diameter than the opening 113 in spinner shell 108, and a lower portion 232 of a diameter equal to or slightly greater than the outside diameter of the upper end of the shell 108. When the two arms are engaged on the upper end of a shell 108, the complementary portions 232 receive the upper end of the shell with the edge around opening 113 being disposed beneath shoulder 233, and the complementary portions 231 forming a funnel-shaped guide leading into the upper conical opening 113. Arms 229 and 230 are rather loosely pivotally mounted at 234 on a bracket 235 secured atop a hollow support standard 236. The arms 229 and 230 are spring biased into abutting relation by compression springs (not shown) supported in blocks 237 and 238. A pointed reciprocable pin 239 (FIGS. 11 and 15) extends upward through the standard 236 and is driven upward in suitable timed relation to the operation of the disclosed machine to force the two arms 229 and 230 apart. Pin 239 is driven by a driver 240, a plunger 241 and a plate 242 engaging the lower end of pin 239 as seen in FIG. 15. Arm 236a supports standard 236 and is positioned by suitable means to move the device 228 laterally and vertically between the operative position of FIG. 13 and the retracted position of FIG. 11.

With continued reference to FIG. 15, the illustrated mechanism for providing desired movements of the gatherer-tucker mechanism includes the racks, pinions and related cables aforedescribed as well as an arm 243 secured to a drive rod 244 extending through the hollow shaft 168. Rod 244 is connected to the support block 171 through another arm 245 and a connecting link 245a (FIG. 2) to reciprocate the support block and gatherer 166 along support arm 167 upon rotary oscillation of rod 244. Rod 244 is rotated through suitable reciprocation of a connecting rod 246 attached to arm 243. The hollow shaft 168 is supported on rod 244 through a collar 247 whereby reciprocation of rod 244, as by actuator arm 248, vertically reciprocates support arm 167 and gatherer 166. Arm 249 is connected to shaft 168 to rotate this shaft and hence swing support 167 and gatherer 166 about the shaft axis in response to reciprocation of connecting rod 250. Rod 250 is slidably engaged in socket member 251 and connected thereto by a tension spring 252 to permit completion of a standard drive stroke by rod 250 even though rotation of shaft 168 and hence movement of the arm 249 and socket member 251 may be limited by the stop arrangement comprising arm 226 and abutment plate 225. An elongated abutment member 253 on arm 249 engages a stop 254 on the fixed sleeve 169 to provide a fixed limit for counterclockwise movement of gatherer 166 in a position where a grasped ribbon end is aligned with a spinner in position III.

*Operation of gatherer-tucker*

As a folded length of ribbon is moved from position II to position III, the tail T extends generally parallel to the adjacent edge of table 91 and transverse to the longitudinal axis of gatherer 166 as seen in FIG. 11. At this stage the support arm 167 and gatherer 166 are in their "neutral" position represented in FIG. 2 wherein they extend generally radially inward with respect to table 91, gatherer 166 is retracted on support 167, away from table 91, movable finger 188 is withdrawn and raised as in FIG. 21, and the guide device 228 is withdrawn as in FIG. 11. Support block 171 is then advanced along support 167 to extend fixed finger 186 and tube 215 beneath the ribbon tail T adjacent the topmost fold, and rack 191 is driven forward to close finger 188 and grasp tail T (note FIG. 11, though in this figure lateral movement of gatherer 166 has already begun).

A vacuum is then drawn in unit 219 to release brake plate 221; the ribbon overlies holes 217 and prevents bleeding-in of air to break this vacuum. Support 167 and gatherer 166 are then rotated clockwise (as viewed from above) about the axis of shaft 168, with arm 226 engaging plate 225 and driving arm 223 clockwise. Immediately upon exposure of holes 217 beyond the distal end of tail T as in FIG. 12, air bleeds therethrough to break the vacuum in unit 219 whereby plate 221 is engaged against brake 222 and clockwise rotation of gatherer 166 is halted despite continued movement of drive rod 250. This insures a uniform length of extension of ribbon beyond fingers 186–188 despite variations in the lengths of tails T.

Rack 191 is then retracted to move ears 195 toward ears 193 and laterally collapse or gather the engaged end of tail T. Simultaneously, gatherer 166 is raised by upward movement of shaft 244, pivoted counterclockwise about the axis of shaft 168 by operator 246, and rotated about 3/4 of a turn clockwise about its own axis (as viewed from the forward end in FIG. 11) to place the gathered ribbon end over and in alignment with the respective spinner 37 as in FIG. 13. Rotation of gatherer 166 also rotates cam 177 to move the tube 215 clockwise to an out-of-the-way position. Meanwhile the guide device 228 has been moved from the retracted position of FIG. 11 to the position shown in FIG. 13, and arms 229 and 230 are closed on the upper end of the spinner by retraction of pin 239 to form a funnel-shaped guide channel leading to opening 113 in the spinner 37. Free mounting of the arms 229 and 230 facilitates self alignment of these arms on the spinner as they are closed, and downward movement of the guide device insures that shoulder 233 closely engages the upper edge of shell 108 to prevent catching of ribbon therebetween. Gatherer 166 is then moved downward by lowering of rod 244 and support 167 to start the tail T into opening 113, the guide arms 229 and 230 are opened, device 228 is retracted, and the gatherer is moved further downward to extend the tail into the spinner, and well below shoulder 114. Pin 109 is then driven upward by a suitably timed reciprocating driver to wedge the inserted ribbon against shoulder 114 and thereby to securely grip tail T. Next, rack 191 is moved forward to open finger 188, and the gatherer 166 is retracted along support arm 167 and disengaged from the ribbon, whereupon the gatherer-tucker mechanism returns to its starting position preparatory to operating upon the tail of next article blank.

The turret is then cycled to move the article blank to position IV with hand 36 still in engagement with the accumulated folds and the tail-end of the ribbon gripped in spinner 37.

*Mechanism at position IV*

The mechanism at position IV is adapted to draw the spinner 37 downward while rotating it to draw and twist the tail T into the form of a stem and to twist the accumulated folds into a decorative form. Referring to FIG. 23 the drawing mechanism includes a reciprocable shaft 255 and an attached plate 256 which engages over the roller 115 on support 110. Rotary drive for spinner 37 is provided through a cup-shaped clutch head 257 which receives the depending end of pin 109 and includes a friction-ring 258 for drive engagement with the bottom plate 108a of the spinner. A spline shaft 259 is reciprocably mounted in bearing 260 and supported by arm 261. A drive gear 262 slidably receives the shaft 259 and is driven to rotate the clutch head 257 in its various stages of vertical movement. The clutch 257 is constantly rotated, and timing of the rotation of spinner 37 is regulated by appropriate longitudinal movement of shaft 259 to selectively engage the clutch 257 with the spinner 37. The clutch 257 may be biased toward its upper, engaging position, as by a tension spring 263. Thus the clutch moves downward with the spinner 37 as shaft 255 is retracted, and is selectively driven to a lower, disengaged position by suitably timed drive means for operating arm 261.

Referring now to FIG. 22, a presser foot 264 and a spray nozzle 265 are fixed to a reciprocating shaft 266 (note also FIG. 6) and disposed over the center of disk 35 at position IV. A flexible conduit 267 connects to nozzle 265 for supplying fluid material thereto.

*Operation at position IV*

As turret 34 is cycled to carry a disk 35 and supported accumulated folds to position IV, the hold down hand 36 is still clamped on top of the folds and the end of ribbon tail T is gripped in the upwardly projecting end of spinner 37. Plunger 255 is initially in its upper position to receive roller 115 beneath plate 256. Plunger 255 then moves downward a short distance, e.g., about 2″, to pull the spinner 37 downward and thereby pull the end of the tail T downward through the center of the accumulated folds. Presser foot 265 descends to compact the folds and is again raised by appropriate reciprocation of shaft 267. Hold down hand 36 is then raised and retracted as illustrated in FIG. 22, and at positions IV through XII in FIG. 1, by a reciprocating actuator which engages roller 125 (FIG. 24) to lift shaft 118 and engage roller 128 on cam surface 121. Meanwhile the clutch 257 is being constantly rotated and is projected upwardly by arm 261 and spring 263 to engage the bottom plate 108a on the spinner 37. As the clutch 257 engages the spinner and rotates it in a clockwise direction (as viewed from above), plunger 255 is moved downward to draw the spinner assembly and hence the ribbon end further downward. The resulting drawing and twisting operation twists the drawn end of the ribbon into a stem-like portion S and also twists at least the upper layers of folds to tighten them into convolutions which vary in degree of tightness toward the center, whereby these folds assume the general configuration of the central, unopened, and partially opened petals of a flower, see FIG. 29.

Setting or adhesive material is applied through nozzle 265 prior to and/or during the spinning operation.

Clutch 257 is then disengaged from the spinner, the shaft 255 returns to its upper position and spinner 37, still engaging the ribbon end, remains fixed in its lower position by frictional engagement with the support posts. The turret is then cycled to move the disk 35 to the next position whereupon roller 124 engages upon the rail 126 which holds shaft 118 in its upper position and thus maintains hand 36 in its retracted position.

Auxiliary heating and/or air supply means may be included if necessary to aid in drying of the articles subsequent to position IV.

After the applied setting fluid has dried to set the center folds of body W and the twisted tail or stem S in their acquired configuration, such as during passage through positions V and VI, the basic flower-like decorative article B is completed and may be removed. However, in the illustrated machine, the completed articles are not removed until they reach position XII, where they are automatically removed as will be outlined below. The intermediate stations may be utilized for drying purposes and/or the performance of additional steps, e.g., to further embellish the articles being produced as by applying sequins or other glitter material, or by applying simulated leaves or the like. In the illustrated machine, disk indexing mechanism is provided at position VII, and the accessory forming and applying mechanism of FIGS. 36–39 is adapted to cooperate with this mechanism to apply a strip L (FIG. 37) to the underside of body W to form article B' (FIG. 29).

*Indexing mechanism at position VII*

With reference now to FIG. 25, the indexing mechanism at position VII includes a reciprocable shaft 268 provided with two blocks 269 and 270 normally positioned to receive roller 115 therebetween. An inclined guard rail 271 is positioned above the path of roller 115 and serves as a safety device to insure that the roller and the spinner support 110 are in position for roller 115 to pass between blocks 269 and 270, though the roller is normally so positioned by the shaft 255 and plate 256 at position IV. An elongated arcuate block 272 is mounted on a reciprocable actuator rod 273 beneath the position normally assumed by the pins 101 as the disks 35 reach position VII. The length of block 272 allows for normal variation in the positioning of the pins. Rod 273 is then moved upward to engage block 272 against pin 101 and open clip 95. Shaft 268 is next moved upward to lift the spinner support 110 and hence to raise the body W of the article above disk 35, whereby the leading end of the ribbon is freed from clip 95, see FIG. 36. While the article is raised, block 272 is moved downward and a friction clutch engages and drives member 103 to rotate disk 35 counterclockwise. After block 99 clears block 272, block 272 is raised into the path of block 99 and thereby serves as a limit stop to the rotation of disk 35. This indexes the disk 35 for proper alignment of clip 95 with the ribbon feed guide 50 when the disk is returned to position I.

While the article B is raised at position VII, the auxiliary strip L may be placed astraddle the stem S over disk 35 and beneath body W, either by hand or mechanically, such as by mechanism 43 (FIG. 36). The strip L may be provided with securing means, for instance adhesive on its upper surface, for securement to body W upon subsequent downward movement of the article. Such downward movement of the body is provided by rod 268 which engages block 270 on roller 115 and moves spinner 37 downward to firmly seat body W on the securing means for retaining strip L.

Drying of adhesive used to secure the strip L to body W, and additional manipulative or ornamenting steps may be carried out at the subsequent positions VIII through XI assumed by the article B' as the turret is cycled.

*Discharge mechanism*

Referring to FIGS. 1, 2 and 26, the discharge mechanism 44 at position XII comprises a bifurcated plate 274 mounted on the end of an operating rod 275 rotatably supported on arm 276. Arm 276 is in turn supported on a shaft 277 suitably driven for reciprocation and rotation in timed relation with the operation of the machine 30. A tension spring 278 connected to shaft 277 and to an arm 279 on rod 275 biases the plate 274 to a normal horizontal position as illustrated in FIG. 26.

In operation, as a work station on turret 34 approaches position XII, stem S is still engaged in spinner 37 and hold down hand 36 is maintained in its raised retracted position. The arm 276 is positioned to place plate 274 over and adjacent the top of table 91 with slot 281 in alignment with the opening 98 in disk 35, note FIG. 2. The roller 115 engages a fixed cam rail 280 whereby the spinner 37 and the gripped article are raised as they approach position XII, and the body W passes above plate 274 with stem S being received in slot 281. As the article engages the plate 274, the shoulder 282 on the respective pin 109 (FIG. 27) engages a fixed cam or a reciprocable member (not shown) which forces pin 109 downwardly to release the end of the stem previously grasped in the spinner 37. Arm 276 is then raised to clear the stem S from disk 35, and is rotated clockwise (as viewed from above) to carry the article B' to one side of table 91 and place arm 279 over a fixed post 283. Shaft 277 then moves downward whereby arm 279 engages post 283 and thereby rotates plate 274 as in FIG. 1 so that the article B' thereon will slide off to a suitable receptacle or conveyor.

*Accessory Applying Apparatus*

Referring now to FIGS. 36–39, the illustrated accessory applying apparatus 43 is designed to form a strip L with a central notch N and diagonally cut ends $E_1$ and $E_2$ from a supply of ribbon $L_1$ and to position the strip astraddle stem S beneath body W at position VII. The apparatus 43 includes an elongated covered ribbon guide channel 285 having a slot 286 through a portion of the cover. A reciprocating carriage 287 is supported on rails 287a and is driven by an oscillatable arm 288 projecting upward through a slot 289 in the machine top. A gripper 290 is eccentrically supported on pivot shaft 290a on the carriage and extends inwardly of the guide through slot 286 to engage ribbon against the bottom of the guide and thereby to slide the ribbon therealong as the carriage moves to the right in FIG. 36, but without moving the ribbon as the carriage moves to the left. An operating arm 290b is secured on shaft 290a and frictionally engages one rail 287a for movement between stop pins 290c to augment the gripping and releasing action of gripper 290 as the carriage reciprocates. Three cutters including movable scissor blades 291, 292 and 293 are pivotally mounted adjacent the guide and in alignment with appropriate openings in the guide as illustrated. The blades 291, 292, and 293 are connected to a reciprocable shaft extending upward through standard 294 by operating arms 295, 296 and 297 together with connecting rods 298, 299 and 300, and bar 301. Blades 291 and 292 are disposed at equal but opposite shallow angles to lines normal to the axis of guide 285 to cut the respective sides of notch N. Blade 293 is disposed at an angle of about 45° to the axis of the guide to cut the ends E₁ and E₂.

A transfer guide 302 is pivotally mounted on frame 304, which is in turn slidably mounted on rail 305. The guide 302 includes two opposed plates 306 and 307 adapted to receive ribbon therebetween when aligned with the ribbon passage in guide 285 at the outer end of the normal movement of frame 304 as illustrated in FIG. 36. Each plate is formed with a slot 308 to register with opening 98 in a disk 35 at position VII when the frame 304 is at its opposite end of movement on rail 305. Plate 307 is supported on a hollow shaft 309 which is rotatably mounted on frame 304, and plate 306 is mounted on an independently rotatable shaft 310 (FIG. 38) extending axially through shaft 309. Suitable means, such as a tension spring 312, biases the plates to a position of face-to-face ribbon-clamping contact and assures lateral abutment of the support portions 306a and 307a. An arm 313 is mounted on the drive hub of blade 293 and extends beneath a lip 314 on plate 306 when guide 302 is in its outer extended position. When the blades 291–293 are opened for advancing movement of the ribbon L₁, arm 313 raises plate 306 slightly, relative to plate 307, as illustrated in FIG. 36, to admit the ribbon therebetween. A tab 315 mounted on plate 306 extends beneath the adjacent portion of plate 307 to limit the relative opening movement of plate 306 and thereby prevents a ribbon guide rib 316 on plate 306 from moving out of a cooperating slot 317 in plate 307. Rib 316 thus forms the rear wall of a ribbon receiving slot between plates 306 and 307, this slot being open along the front and both side edges of the plates. When the blade 293 is closed to cut off a strip L projected between plates 306 and 307, arm 313 is retracted to permit the plates to close and grip the strip therein under the influence of spring 312, note FIG. 38.

A pinion 318 is mounted on the end of shaft 309 and meshes with a sector gear 319 pivotally mounted on frame 304. A tension spring 320 secured to the outward portion of sector gear 319 urges the gear in a clockwise direction as viewed in FIG. 38. A stop 321 on gear 319 engages a stud 322 fixed to the frame on support 323 and thereby causes clockwise rotation of gear 319 as frame 304 moves to its retracted or outer end position as seen in FIG. 38. An oscillatable drive arm 324 engages and reciprocates frame 304 along rail 305. As the frame 304 is moved inwardly from the position of FIG. 38, sector gear 319 is moved away from stud 322 whereby spring 320 drives gears 318 and 319 to rotate the shaft 309 180° clockwise and thereby to reverse the position of hand 302 and place it generally parallel to but slightly above table 91. This rotation is accomplished before the distal edge of guide 302 reaches the adjacent edge of disk 35 and places slots 308 in alignment with and open toward the opening 98 of the disk 35 in position VII. Continued advancement of frame 304 then slides guide 302 over the disk 35 with slots 308 in registry with the opening 98 as illustrated in FIG. 39. Simultaneously, a roller 325 on an arm 326 secured to the end of shaft 310 engages a fixed cam member 327 and thereby is urged downwardly to again move plate 306 away from plate 307 to release the transferred strip L. Subsequent reciprocation of frame 304 in the opposite direction first retracts guide 302 from its position above disk 35 and, upon engagement of stop 321 with stud 322 causes reverse rotation of the shaft 309, whereupon the guide 302 is returned to the position of FIG. 36.

A receptacle 329 for adhesive is positioned beneath the outer end position of guide 302 as illustrated in FIG. 36. A reciprocable rod 330 supports a dauber 331 on a J-shaped arm 332 extending downward into receptacle 329.

Operation of Accessory Applying Apparatus

A supply of ribbon L₁ is suitably supported, as on standard 333. Arm 288 is actuated in timed relation with the cycling of turret 34 to drive carriage 287 and thereby to advance ribbon L₁ a distance equal to the desired length of a strip L once during each cycle of the turret, while guide 302 is in the position illustrated in FIG. 36 and the blades 291–293 are open. After each advancing movement, the blades 291, 292 and 293 are actuated to make the respective cuts and to release plate 306 to clamp the ribbon in guide 302. Blades 291 and 292 sever the opposite sides of notch N during successive cycles while blade 293 cuts off the strip L which is advanced into guide 302 on each forward movement of carriage 287. Rod 330 then carries dauber 331 upward, out of the liquid adhesive in container 329, and into contact with the strip L to apply a horseshoe-shaped patch of adhesive A around the apex of notch N as shown in FIG. 39. Arm 324 then drives frame 304 forward to rotate guide 302 to its strip applying position and to slide it over disk 35, astraddle stem S and beneath the raised body W at position VII, and to release the strip as aforedescirbed. Rib 316 serves as a rear wall or a guide for the ribbon entering the transfer guide 302 and abuts the adjacent edge of the strip L for pressing the strip onto stem S during the sliding movement of the guide 302. Subsequent downward movement of the artticle B seats the body W on the adhesive patch A and thereby retains the strip L as arm 324 is reversed to withdraw guide 302 and to return the frame and guide to the position of FIG. 36 to receive the next strip L.

Shaft 310 extends beyond pinion 318 a sufficient distance to provide clearance between pinion 318 and arm 326 equal to or greater than the length of tab 315. This permits opening of guide 302 for cleaning purposes simply by selectively moving plate 306 laterally against the force of spring 312 until tab 315 clears plate 307, then swinging plate 306 away from plate 307.

Clutch Apparatus

It has been found that positive drive engagement provides certain advantages over simple frictional engagement for driving hub member 103 during the folding operation at position I. For instance, positive engagement avoids the slippage or lost motion normally encountered if the driving and driven members are not precisely coaxially aligned and thereby eliminates problems of precise alignment. Also, positive engagement provides more accurate control of the degree of turn for each fold and insures the accuracy of positioning of pin 101 after a complete set of folds are formed for later engagement by cooperative mechanism such as block 272 at position VII.

One arrangement for the abovenoted positive engagement is disclosed herein by way of the slots 107 in hub 103 and the cooperative clutch member 335 illustrated in FIG. 10. Several slots 107 are uniformly distributed around the periphery of hub 103. Member 335 comprises a pair of spaced parallel plates 336 and 337 mounted on shaft 338 and supporting a plurality of pins 339. Shaft 338 is mounted and driven for reciprocable motion to engage pins 335 in slots 107 and for rotary motion to drive the hub 103. The pins 339 are disposed on a circle of a radius to intersect the slots 107 when concentrically disposed relative to the hub 103, and each pin is urged toward the upward extended position illustrated in FIG. 10 by a compression spring 340 confined between plate 336 and a cross pin 341 in the respective pin 339. The pins 339 are disposed at different angular positions, relative to one another, than the slots 107 and are so positioned that only one pin will engage a slot 107 at any one time and so that a pin 339 will always engage a slot 107 within a few degrees of rotation of member 335. In one illustrative arrangement nine slots 107 are equiangularly disposed about the periphery of hub 103 at 40° spacings, while five pins 339 are disposed so that with one pin engaged in a slot 107, the other four pins are positioned, respectively, at angles of 8°, 16°, 24° and 32° from the slot 107 next adjacent in the direction of rotation. One disposition of pins 339 to effect this arrangement is with five pins 339 at equiangular spacings of 72° around member 335. This arrangement assures positive drive engagement between member 335 and hub 103 within 8° of rotation of member 335, thereby minimizing problems of prealignment of member 335 and hub 103 while assuring positive engagement within a small range of possible lost motion. The maximum limit of lost motion encountered as member 335 engages hub 103 may be decreased by increasing the number of pins 339. By way of example, assuming the provision of nine slots 107 at 40° spacing, eight pins 339 disposed at 45° to one another provides maximum engagement lost motion of 5°, and ten pins at 36° spacings would limit it to 4°, the theoretical maximum lost motion being equal to the slot spacing divided by the number of pins 339.

In one specific illustrative example of the operation of the aforedescribed machine, decorative articles are formed utilizing a ribbon R comprising a 1¼" wide ribbon product sold under the trademark "Satintone" by Chicago Printed String Co. of Chicago, Illinois. This ribbon product comprises parallel, aligned, viscous rayon yarns bonded by a polyvinyl alcohol adhesive. The ribbon feed and folding mechanism is operated to form twenty-six folds at position I, each fold being formed by rotation of disk 35 through an angle of about 100°. To form these folds and allow time for cycling the turrent 34 from position to position, a drive ratio of 28:1 is used between the drive for operating the feeding and folding apparatus and the timing drive for cycling the turret and actuating the mechanisms which function once during the forming of an article B'. Sensing tube 215 and the holes 217 therein are so positioned that the length of ribbon extending beyond fingers 186 and 188 during the gathering and tucking operation is about ⅜". The spinner is drawn downward at position IV about 2" before it is rotated, and thereafter it is moved downward about an additional 1" while being rotated about 10 revolutions to twist stem S and tighten the upper turns of folds. The body W of the resulting article B has an overall diameter of about 2½" to 2¾", and is approximately 1" deep. Due to resolubility of the adhesive in water, i.e. the development of tack, the aforementioned ribbon product has the characteristic of adhering to itself when wetted with water. Hence water is applied through nozzle 41 at position I and nozzle 42 at position II to adhere the base folds of the body together and to set the twisted stem and the coiled center folds. After drying, stem S is of sufficient rigidity to lift the body W by upward movement of the spinner 37 at position VII. Strip L is of an average length of about 3½" and is formed of a ribbon product such as that mentioned above but normally is of a contrasting color. The resulting article B', when formed from ribbon R and L₁ of appropriate colors, bears a pleasing resemblance to a partially opened double rose bloom with a pair of leaves projecting on opposite sides, note FIG. 29. However, this appearance can be varied e.g. to more closely represent a newly opening bud, or a more fully opened bloom, by varying the number of revolutions of the twisting mechanism during the stem and fold twisting step.

It will be noted that the ribbon feed guide 50 is disposed to direct the ribbon toward the side of disk 35 which moves away from the guide during the ribbon folding operation, and the ribbon is rotated in a direction to form the folds by turning the outer edge of the ribbon (with respect to disk 35) beneath the ribbon being fed as each new fold is formed. The direction of rotation of the feed guide 50 is clockwise as viewed in the direction of ribbon feed, i.e., counter to the direction of rotation of the adjacent disk 35. The direction of turn of the twists or folds thus formed in the ribbon as it is fed to disk 35 is the same as the direction of turn of the convolutions or helix of folds on the disk 35 when both are viewed along the length of the ribbon, e.g. both the folds and the helix being counterclockwise with the illustrated machine. This results in an interlocking arrangement of the folds which enhances the forming of a decorative article having a compact, integral body and a pleasing appearance after the upper or center folds are later rearranged and tightened by counter-rotation of the threaded tail end (clockwise as viewed from above).

While the term "ribbon" has been utilized in describing the operation of the illustrated embodiment of this invention, and one specific ribbon product has been mentioned, it will be appreciated that machines in accordance with the invention may be operated with ribbon, tapes and other strip materials of similar characteristics.

It will thus be seen that an invention has been made and disclosed herein whereby novel improved machines may be constructed by those skilled in this art to rapidly produce distinctive decorative articles from ribbon, including articles resembling a natural rose. Further, such machines are capable of automatic operation whereby such decorative articles may be produced rapidly and economically.

It will be appreciated that the illustrated machine embodies a combination of operative mechanisms which cooperate to obtain the broader objects set forth herein. At the same time it will also be appreciated that various improved machine components and subassemblies have been disclosed and including in the illustrated machine which are themselves new and novel and have utility apart from their incorporation in the illustrated overall combination.

While particular embodiments of the invention have been shown, it will be understood, of course, that the invention is not limited thereto since many modifications may be made by those skilled in the art in light of the foregoing teachings. Therefore, it is contemplated by the appended claims to cover any such modifications as fall within the true spirit and scope of the invention.

I claim:

1. In a machine adapted for use in forming decorative articles from ribbon or the like, a support having a ribbon supporting surface, feed means for feeding successive lengths of ribbon onto said support surface, said feed means being rotatable about an axis generally parallel to the direction of feed of such ribbon to said support surface by said feed means, and means operable with said support and feed means for forming a series of folds of ribbon from such successively fed ribbon lengths and retaining such folds in a predetermined arrangement on said support surface.

2. In a machine adapted for use in forming decorative articles from ribbon or the like, support means having a ribbon supporting surface, a rotatably mounted feed guide for feeding successive lengths of ribbon onto said support surface and rotating such ribbon, means operable with said support and feed means for forming a series of folds of ribbon on said support surface from such successively fed ribbon lengths and retaining such folds on said support surface in symmetrical disposition about a given axis, and means for threading one free end of the ribbon forming such folds through such symmetrically disposed folds, along such axis, and twisting said end to form such folds into a decorative article.

3. In a machine as in claim 2, means for applying securing material to such folds to set such folds in the form of a decorative article.

4. A machine adapted for use in forming decorative articles from ribbon or the like, comprising rotatably mounted support means, and feed means including a feed guide adjacent said support means for feeding successive lengths of ribbon to said support means along an axis of feed angularly disposed relative to the axis of rotation of said support means, said feed guide being rotatable about said axis of feed to form a series of folds of ribbon in a predetermined arrangement on said support means.

5. A machine as in claim 4 and wherein said feed guide is disposed to direct such ribbon to said support at one side of the axis of rotation of said support.

6. A machine as in claim 5 and wherein the direction of rotation of said support is such that the surface thereof receiving the ribbon lengths moves away from said guide as said support is rotated, and the direction of rotation of said guide, as viewed in the direction of ribbon feed, is counter to the direction of rotation of said support, as viewed from the ribbon support side thereof.

7. A machine as in claim 4 and wherein said feed guide is rotatable about an axis substantially normal to the axis of rotation of said support means.

8. A machine adapted for use in forming decorative articles from ribbon or the like comprising rotatably mounted support means, feed means for feeding successive lengths of ribbon to said support means and including a feed guide through which such ribbon is directed to said support means, said guide being intermittently rotatable about an axis generally parallel to the direction of feed of such ribbon to form a series of folds of ribbon on said support surface, and a ribbon supply support rotatable in coordination with said feed guide.

9. A machine adapted for use in forming decorative articles from ribbon or the like comprising a rotatable support, feed means for feeding successive lengths of ribbon to said support and including a feed guide through which such ribbon is directed to said support means, said guide being rotatable about an axis generally parallel to the direction of feed of such ribbon to form a series of folds of ribbon on said support, and fold engaging means operable with said support for retaining the folds of ribbon thereon in a predetermined arrangement as said support is rotated.

10. A machine adapted for use in forming decorative articles from ribbon or the like comprising a rotatable support, reversible feed means for feeding successive lengths of ribbon to said support and drawing back on such lengths of ribbon, said feed means including a rotatable ribbon guide for rotating such ribbon to form a series of folds of ribbon on said support, and fold engaging means for engaging within each fold of ribbon as it is formed on said support whereby each fold may be drawn taut over said engaging means by said feed means.

11. A machine adapted for use in forming decorative articles from ribbon or the like comprising a rotatable support member, feed means for feeding successive lengths of ribbon to said support member and including a rotatable feed guide for rotating such ribbon to form a series of folds of such ribbon on said support member, presser means movable into engagement with said support member and movable therewith as said support member is rotated to retain folds of ribbon thereon, and clamping means for retaining such folds on said suport member during disengagement of said presser means therefrom.

12. In a machine adapted for use in forming decorative articles from ribbon or the like, a rotatable support, ribbon feed and folding means for forming a length of ribbon into a series of folds helically arranged on said support and including a ribbon guide disposed to direct ribbon to said support at one side of the axis of rotation thereof, the direction of rotation of said support being such that the side thereof opposite said guide moves away from said guide, intermittently operable and reversible feed means for feeding successive lengths of ribbon to said support through said guide, said guide being intermittently and unidirectionally rotatable about the axis of feed of ribbon to said support in a direction of rotation counter to the direction of rotation of said support, a presser member reciprocably supported for engagement with and rotation with said support to retain folds of ribbon thereon, a clamping member selectively engageable with said support to retain folds of ribbon thereon during disengagement of said presser member therefrom, a finger pivotally mounted adjacent said support and positionable thereover to selectively engage in each fold during formation thereof, and a guard plate pivotally mounted adjacent said support and selectively positionable over said side of said support beneath said finger.

13. A machine adapted for use in forming decorative articles from ribbon or the like comprising support means having a ribbon supporting surface, rotatable feed means for feeding successive lengths of ribbon to said support surface and rotating such ribbon, means operable with said support means and said rotatable feed means to accumulate a series of folds of such ribbon on said support surface, and a gripper adapted to retain an end of such ribbon accumulated in folds on said support surface and to twist such ribbon to rearrange such folds in said series for forming a decorative article.

14. A machine adapted for use in forming decorative articles from ribbon or the like comprising support means having a ribbon supporting surface, rotatable feed means for feeding successive lengths of ribbon to said support surface and rotating such ribbon, means operable with said support means and feed means to accumulate a series of folds of such ribbon on said support surface, in a generally circular arrangement, means for threading one end portion of the ribbon forming such accumulated folds through the center of such arrangement of folds, and means for twisting such end portion of the ribbon to form a decorative article.

15. A machine adapted for use in forming decorative articles from ribbon or the like comprising a rotatable support, feed means for feeding successive lengths of ribbon to said support and including a feed guide rotatable about an axis generally parallel to the direction of feed of such ribbon to accumulate a series of folds of such ribbon in a generally circular arrangement on said support, said support being formed with a central opening, a rotatable spinner member reciprocably supported beneath said support and including ribbon gripping means in alignment with and adapted to project upwardly through said central opening, a gatherer adapted to grasp a free end of ribbon extending from such folds on said support and position such end in engagement with said ribbon gripping means, and means for retracting and rotating said spinner member to twist such folds into a decorative form.

16. A machine as in claim 15 and including guide members movable into registry with said spinner to guide said ribbon end into said ribbon gripping means.

17. A machine adapted for use in forming decorative articles from ribbon or the like comprising a plurality of rotatable ribbon supports, said supports being movable to a plurality of operating positions and each being formed with a central opening, feed means including a feed guide adjacent one of said positions for feeding successive lengths of ribbon to said supports at said one position, said feed guide being rotatable about an axis generally parallel to the direction of feed of such ribbon, means operable with said supports and feed means to accumulate and retain a series of folds of such ribbon in a predetermined arrangement on each of said supports, a rotatable spinner member supported beneath each of said supports and including ribbon gripping means in alignment with said opening in the respective support, a gatherer adapted to grasp a free end of ribbon extending from such folds of ribbon on each support and position such end in engagement with the respective ribbon gripping means, and means at another of said positions for rotating said spinner members to twist such folds into a decorative form.

18. A machine as in claim 17 and including means for retracting each of said spinner members from said support as the respective spinner member is rotated to twist such folds.

19. A machine as in claim 17 and including applicator means adjacent said one of said positions and adjacent said another of said positions for applying a ribbon setting agent to such ribbon.

20. A machine as in claim 17 wherein said gatherer is disposed at one of said positions other than said first position, and including guide members mounted adjacent said gatherer and movable into registry with said spinner members to guide such ribbon ends to said ribbon gripping means.

21. A machine as in claim 17 and including a discharge device positioned to engage decorative articles on said supports and operable to remove such articles from said supports.

22. A machine adapted for use in forming decorative articles from ribbon or the like comprising a rotatable turret, a plurality of rotatable supports on said turret and movable thereby to at least three operating positions, said supports each being formed with a central opening, ribbon feed means including a feed guide adjacent one of said positions for feeding successive lengths of ribbon to said supports at said one position, said feed guide being rotatable about an axis generally parallel to the direction of feed of such ribbon, means operable with said supports and feed means to accumulate and retain a series of folds of such ribbon in a generally helical pattern on each of said supports, a rotatable spinner member supported beneath each of said supports and including ribbon gripping means in alignment with said opening in the respective support, a gatherer adapted to grasp a free end of ribbon extending from such folds of ribbon on each support and position such end in engagement with said ribbon gripping means, drive means at a second of said positions for rotating said spinner members to twist such folds into a decorative form, means for retracting said spinners from said supports as said spinners are rotated, means for reciprocating said spinners at a third position, and means for positioning a strip of ribbon between such folds and the respective support at said third position as the respective spinner is reciprocated.

23. In a machine adapted for use in forming decorative articles, a mechanism adapted to feed ribbon or the like comprising a guide member, two feed rollers mounted for engagement with ribbon in said guide member, a drive roller mounted adjacent one of said feed rollers, and another drive roller mounted adjacent the other of said feed rollers, each of said drive rollers being selectively movable into and out of drive engagement with the respective feed roller.

24. A feed mechanism adapted for use in feeding ribbon or the like comprising a guide having a ribbon passage extending therethrough, said guide being mounted for rotation about the longitudinal axis of said passage, a pair of opposed feed rollers positioned to engage ribbon in said passage and mounted for rotation with said guide whereby each of said feed rollers is movable to a first position as said guide is rotated, and a drive roller disposed adjacent said first position to selectively engage said feed rollers in said first position as said guide is rotated.

25. A feed mechanism adapted for use in feeding ribbon or the like comprising a guide having a ribbon passage said guide being mounted for intermittent rotation about the axis of said passage, a feed roller positioned to engage ribbon in said passage and mounted for rotation with said guide to a plurality of positions, and a plurality of drive rollers, one of said drive rollers being disposed adjacent one of said positions to selectively engage said feed roller when said feed roller is in said one position, and another of said drive rollers being disposed adjacent another of said positions to selectively engage said feed roller when in said other of said positions.

26. A feed mechanism adapted for use in feeding ribbon or the like comprising a guide having a ribbon passage extending longitudinally therethrough, said guide being mounted for intermittent rotary reversal about the longitudinal axis of such passage, a pair of opposed feed rollers positioned to engage ribbon disposed in said passage and mounted for rotation with said guide, and a pair of drive rollers disposed on opposite sides of said guide to selectively engage said feed rollers as said guide is rotated through successive half-revolutions.

27. Apparatus adapted for use in collecting ribbon comprising a pair of opposed clamping fingers adapted to engage ribbon therebetween and each including a projection extending transversely of the plane to be occupied by ribbon engaged between said fingers, one of said fingers being slidable longitudinally of the other of said fingers to move the projection thereon toward the projection on the other finger and thereby to laterally collapse ribbon engaged between said fingers.

28. Apparatus adapted for use in collecting ribbon as in claim 27 wherein said slidable finger is pivotally supported, and including a drive linkage for said slidable finger comprising a slide link having an inclined cam portion, an extension on said slidable finger engageable with said cam portion to pivot said slidable finger between an open and a closed position relative to the other of said fingers upon reciprocation of said slide link, means for reciprocating said slide link, and a lost motion connection between said slide link and said slidable finger whereby reciprocation of said slide link opens, closes and reciprocates said slidable finger.

29. Apparatus adapted for use in collecting ribbon comprising first ribbon gripping means for yieldably grasping and laterally collapsing ribbon, gauging means for positioning said first gripping means longitudinally of said ribbon a predetermined distance from one end thereof, said first gripping means being rotatable whereby a collapsed ribbon end held thereby may be aligned with ribbon end gripping means, and means for moving said first ribbon gripping means to insert such end in such ribbon end gripping means.

30. Apparatus adapted for use in collecting ribbon as in claim 29, and wherein said gauging means comprises a vacuum operated control device, and a conduit communicating with said device and extending adjacent said gripping means, said conduit being formed with openings disposed adjacent the position normally assumed by ribbon engaged by said gripping means.

31. A machine adapted for use in forming decorative articles as in claim 22, and wherein said means for positioning a strip of ribbon includes a transfer member mounted adjacent said third position, said transfer member being adapted to support a strip of ribbon and being reciprocable between a position overlying a support in said third position and a strip receiving position remote therefrom.

32. Mechanism adapted for use in applying a strip of ribbon or the like to a decorative article comprising a transfer member adapted to receive a length of ribbon and mounted for translational movement, means for feeding successive lengths of ribbon into said transfer member, cutter means for cutting said ribbon adjacent said member, applicator means positioned and adapted to apply adhesive to a strip of ribbon held by said member, and means for driving said member between a ribbon receiving position adjacent said feed means and a strip applicator position.

33. Mechanism as in claim 31 and including cutter means for notching such lengths of ribbon.

34. Mechanism adapted for use in forming and applying strips of ribbon or the like comprising a transfer support adapted to form a ribbon receiving slot open along at least one end and one side, said support mounted for rotary movement through an arc of about 180° between a strip applying and a strip receiving position, feed means including a ribbon guide aligned with said slot when said support is in said strip receiving position for feeding successive lengths of ribbon into said slot, a cutter operable between said guide and said support to sever such ribbon, and applicator means positioned and adapted to apply adhesive to a strip of ribbon held by said support.

35. Strip applicator mechanism as in claim 34 and wherein said transfer support comprises a pair of opposed pivotally mounted plates, each of said plates formed with an elongated opening communicating with said one side thereof and in registry with said opening in the other of said plates, said applicator means including a reciprocable dauber for applying adhesive to the lower side of a strip in said transfer member when said transfer member is in said strip receiving position, said opening in the plate which is lowermost when said transfer member is in said strip receiving position being of a width greater than the width of said dauber.

36. A machine as in claim 2 and wherein said means for threading such free end of ribbon comprises a shell member formed with an open central bore, and means operable in said bore for gripping such free end of ribbon.

37. A machine as in claim 14 and wherein said means for threading such end portion includes a member formed with a bore including an open upper end and an internal aperture of reduced diameter with respect to said open upper end, and a pin member reciprocably supported in said member, said pin member being formed with a pointed upper end and adapted to engage such ribbon end in said aperture.

38. A machine as in claim 15 and wherein said ribbon gripping means includes a shell formed with a bore including an outwardly flaring open upper end in alignment with said central opening, an internal shoulder in said shell adjacent said open upper end, and a pin member reciprocably supported in said shell, said pin member being formed with a pointed upper end and adapted to engage said internal shoulder to grip such ribbon end.

39. A machine adapted for use in forming decorative articles from ribbon or the like comprising a rotatable turret, a plurality of ribbon supports on said turret and movable thereby to at least three operating positions, said supports each being formed with a central opening and means for engaging ribbon, ribbon feed means including a feed guide adjacent one of said positions for feeding successive lengths of ribbon to said supports at said one position, said feed guide being rotatable about an axis generally parallel to the direction of feed of such ribbon and including a pair of opposed feed rollers mounted thereon, a pair of drive rollers positioned to engage said feed rollers, means operable with said supports and feed means to accumulate and retain a series of folds of such ribbon in a generally helical pattern on each of said supports, a spinner member supported beneath each of said supports and including ribbon gripping means in alignment with said opening in the respective support, a gatherer including a pair of relatively movable fingers adapted to grasp a free end of ribbon extending from such folds of ribbon on each support and to laterally collapse the distal end thereof, means for engaging such collapsed ribbon ends with the respective spinner members, and drive means at a second of said positions for rotating and retracting said spinner members relative to said supports to twist such folds into a decorative form.

40. A method of forming decorative articles from ribbon or the like comprising the steps of forming a series of folds of ribbon in symmetrically arranged convolutions with one ribbon end projecting from said folds through the center of said convolutions, twisting said ribbon end relative to said folds while applying ribbon setting fluid thereto, and drying said ribbon to set said folds in the rearranged position resulting from said twisting.

41. A method of forming decorative articles from ribbon or the like comprising the steps of forming a length of ribbon into a series of folds in helically arranged convolutions with a ribbon end projecting from the topmost fold through the center of said convolutions, twisting said ribbon end relative to said folds while spraying ribbon setting liquid into the center of the upper folds, and drying said ribbon to set said folds and end in the rearranged position resulting from said twisting.

42. A method of forming decorative articles from ribbon or the like including a resoluble adhesive comprising the steps of forming a length of such ribbon into a series of folds in helically arranged convolutions with a ribbon end projecting from the topmost fold through the center of said convolutions, twisting said ribbon end relative to said folds while spraying a solvent for said adhesive into the center of the upper folds, and drying said ribbon to set said folds in the rearranged position resulting from said twisting.

43. A machine as in claim 11 wherein said support member is rotatable about an axis and said feed means is disposed to feed such successive lengths of ribbon to said support member at one side of said axis.

44. A machine adapted for use in forming decorative articles from ribbon or the like comprising support means having a ribbon supporting surface, feed means for feeding successive lengths of ribbon to said support means, said support means and feed means being supported for relative rotational movement therebetween whereby ribbon fed from said feed means to said support means may be formed into folds on said support means, means operable with said support and feed means to accumulate a series of such folds of ribbon on said support means, and means adapted to retain an end of such ribbon accumulated in folds on said support and to twist such ribbon to rearrange said folds of said series for forming a decorative article.

45. In a machine adapted for use in forming decorative articles from ribbon or the like, a rotatable support adapted to support a series of folds of ribbon disposed around the axis of rotation of said support, feed means disposed to direct ribbon to said support and to position such ribbon on said support at one side of said axis of rotation, and means cooperating with said support to form ribbon directed from said feed means to said support into a series of folds extending around said axis as said support is rotated and to retain such folds on said support.

46. A machine adapted for use in forming decorative articles from ribbon or the like comprising rotatable support means having a ribbon supporting surface, feed means for feeding successive lengths of ribbon to said support surface at one side of the axis of rotation of said support means, means operable with said support and feed means to accumulate a series of folds of such ribbon on said support surface in a generally circular arrangement as said support means is rotated, means for threading one end portion of the ribbon forming such accumulated folds through the center of such arrangement of folds, and means for twisting such end portion of the ribbon to form a decorative article.

47. A machine adapted or use in forming decorative articles from ribbon or the like comprising a rotatable support means for feeding successive lengths of ribbon to said support and accumulating a series of folds of such ribbon in a generally circular arrangement thereon as said support is rotated, said support being formed with a central opening, a rotatable spinner member reciprocably supported beneath said support and including ribbon gripping means in alignment with and adapted to project upwardly through said central opening, means adapted to position a free end of ribbon extending from such folds on said support in engagement with said ribbon gripping means, and means for retracting and rotating said spinner member to twist such folds into a decorative form.

48. A machine adapted for use in forming decorative articles from ribbon or the like comprising a support having a ribbon supporting surface, feed means for feeding successive lengths of ribbon to said support surface, said support and said feed means having relative rotational movement therebetween for forming such lengths of ribbon into folds on said support surface, and means operable with said support and said feed means to accumulate a series of such folds of ribbon in a generally helical arrangement on said support surface.

49. A machine as in claim 48 including means for threading one free end of the ribbon forming such series of folds through the center of such helical arrangement of folds and twisting said end to rearrange such folds.

References Cited by the Examiner

UNITED STATES PATENTS

| | | | |
|---|---|---|---|
| 858,367 | 7/1907 | Brodtauf et al. | 156—443 |
| 1,729,171 | 9/1929 | Lavley | 57—11 |
| 2,092,464 | 9/1937 | Matthews | 156—61 |
| 2,095,733 | 10/1937 | Coryell | 226—190 X |
| 2,130,209 | 9/1938 | Brun | 156—61 |
| 2,316,798 | 4/1943 | Luebbe | 226—181 X |
| 2,933,223 | 4/1960 | Kravig et al. | 223—46 |
| 2,982,452 | 5/1961 | Anderson | 223—46 |
| 3,064,869 | 11/1962 | Cooper | 226—181 X |
| 3,129,861 | 4/1964 | Napier | 223—46 |

JORDAN FRANKLIN, *Primary Examiner.*

JACOB STEINBERG, *Examiner.*

G. V. LARKIN, W. A. POWELL, *Assistant Examiners.*